US012552058B2

(12) United States Patent
Koeppl et al.

(10) Patent No.: US 12,552,058 B2
(45) Date of Patent: Feb. 17, 2026

(54) ELECTRIC BEARD TRIMMER

(71) Applicant: Braun GmbH, Kronberg (DE)

(72) Inventors: Alois Koeppl, Weilrod (DE); Reinhold Eichhorn, Idstein (DE); Jana Schmitt, Wiesbaden (DE); Martin Fuellgrabe, Bad Camberg (DE)

(73) Assignee: Braun GMBH, Kronberg (DE)

( * ) Notice: Subject to any disclaimer, the term of this patent is extended or adjusted under 35 U.S.C. 154(b) by 852 days.

(21) Appl. No.: 17/157,900

(22) Filed: Jan. 25, 2021

(65) Prior Publication Data

US 2021/0229304 A1 Jul. 29, 2021

(30) Foreign Application Priority Data

Jan. 23, 2020 (EP) .................................... 20153389

(51) Int. Cl.
*B26B 19/38* (2006.01)
*B26B 19/06* (2006.01)

(52) U.S. Cl.
CPC ...... *B26B 19/3846* (2013.01); *B26B 19/3893* (2013.01); *B26B 19/06* (2013.01)

(58) Field of Classification Search
CPC . B26B 19/3846; B26B 19/3893; B26B 19/06; B26B 19/04; B26B 19/044; B26B 19/38
USPC ........... 30/43, 43.91, 43.92, 194, 195, 233.5
See application file for complete search history.

(56) References Cited

U.S. PATENT DOCUMENTS

| | | | |
|---|---|---|---|
| 1,567,110 | A | 12/1925 | Franciss |
| 1,875,125 | A | 8/1932 | John et al. |
| 2,246,586 | A | 6/1941 | Hanley |
| 2,249,825 | A | 7/1941 | Hanley |
| 2,273,739 | A | 2/1942 | Te |
| 2,713,718 | A | 7/1955 | Hudson |
| 2,859,513 | A | 11/1958 | Bylund |

(Continued)

FOREIGN PATENT DOCUMENTS

| | | | |
|---|---|---|---|
| BR | PI1101269 | A2 | 7/2015 |
| CH | 160230 | A | 2/1933 |

(Continued)

OTHER PUBLICATIONS

European search report dated Jul. 16, 2020.

(Continued)

*Primary Examiner* — Phong H Nguyen
(74) *Attorney, Agent, or Firm* — Gerd Zetterer

(57) ABSTRACT

The present invention relates to a cutter system for an electric shaver and/or trimmer, comprising a pair of comb-like cutting elements each with at least one row of cutting teeth and movable relative to each other, wherein one of said cutting elements has thickened and/or rounded tooth tips overhanging the tooth tips of the other cutting element, characterized in that said overhanging tooth tips are provided with a two-step rounding including a spherical or drop-shaped or pearl-shaped thickening and a bent or curved portion connecting said thickening to a main tooth portion and bent away from the skin contact surface of said main tooth portion, wherein a concave depression is formed in the transitional section between said thickening and said bent or curved portion on the skin contact side of the teeth.

11 Claims, 17 Drawing Sheets

(56) References Cited

U.S. PATENT DOCUMENTS

| | | | | |
|---|---|---|---|---|
| 3,271,854 | A | 9/1966 | Gerrit | |
| 3,279,056 | A | 10/1966 | Mathew | |
| 3,467,204 | A | 9/1969 | Jenkinson | |
| 4,011,692 | A | 3/1977 | Bos et al. | |
| 4,614,032 | A | 9/1986 | Szabo | |
| 4,796,359 | A | 1/1989 | Oprach et al. | |
| 4,951,394 | A | 8/1990 | Meijer | |
| 5,600,890 | A * | 2/1997 | Leitner | B26B 19/06 72/340 |
| 5,819,415 | A | 10/1998 | Bruggers et al. | |
| 6,317,982 | B1 | 11/2001 | Andrew | |
| 6,530,150 | B1 | 3/2003 | Barish | |
| 6,658,740 | B2 | 12/2003 | Habben | |
| D672,923 | S | 12/2012 | Loudenback et al. | |
| D672,924 | S | 12/2012 | Amice et al. | |
| 8,393,082 | B2 | 3/2013 | Shimizu | |
| 8,479,400 | B2 * | 7/2013 | Fukutani | B26B 19/06 30/208 |
| 9,156,173 | B2 | 10/2015 | Fuerst et al. | |
| 9,302,401 | B2 | 4/2016 | Geiser et al. | |
| 9,381,656 | B2 | 7/2016 | Van Straaten et al. | |
| D762,391 | S | 8/2016 | Ballmaier | |
| 9,427,881 | B2 | 8/2016 | Floessholzer | |
| 9,533,422 | B2 | 1/2017 | Perez-lopez | |
| 9,789,617 | B2 | 10/2017 | Stapelbroek et al. | |
| 10,081,114 | B2 | 9/2018 | Sablatschan | |
| 10,213,930 | B2 | 2/2019 | Bady et al. | |
| 10,252,429 | B2 | 4/2019 | Sablatschan et al. | |
| 10,391,647 | B2 | 8/2019 | Phoon et al. | |
| 10,647,010 | B2 | 5/2020 | Sablatschan | |
| 10,682,777 | B2 | 6/2020 | Huisman et al. | |
| 10,702,999 | B2 | 7/2020 | Iaccarino et al. | |
| 10,857,686 | B2 | 12/2020 | Wu | |
| 11,104,016 | B2 | 8/2021 | Musallam et al. | |
| 11,179,861 | B2 | 11/2021 | Khubani et al. | |
| 11,260,549 | B2 | 3/2022 | Lap | |
| 11,298,841 | B2 | 4/2022 | De Haas et al. | |
| 11,318,629 | B2 | 5/2022 | Godlieb et al. | |
| 11,351,684 | B2 | 6/2022 | Phoon | |
| 11,370,134 | B2 | 6/2022 | Phoon | |
| 11,453,137 | B2 | 9/2022 | Godlieb et al. | |
| 11,465,303 | B2 | 10/2022 | Stapelbroek et al. | |
| 2002/0129496 | A1 | 9/2002 | Habben | |
| 2006/0225290 | A1 | 10/2006 | Bader et al. | |
| 2009/0119932 | A1 | 5/2009 | Lau | |
| 2010/0299937 | A1 * | 12/2010 | Geiser | B26B 19/3846 76/104.1 |
| 2011/0010941 | A1 | 1/2011 | Lau et al. | |
| 2011/0010942 | A1 | 1/2011 | Lau | |
| 2011/0016723 | A1 | 1/2011 | Maichel et al. | |
| 2014/0310963 | A1 | 10/2014 | Geiser et al. | |
| 2014/0317932 | A1 | 10/2014 | Van Straaten et al. | |
| 2015/0183118 | A1 | 7/2015 | Roth | |
| 2015/0314461 | A1 | 11/2015 | Man Wong et al. | |
| 2016/0229071 | A1 | 8/2016 | Stapelbroek | |
| 2016/0229072 | A1 | 8/2016 | Stapelbroek et al. | |
| 2016/0236361 | A1 | 8/2016 | Stapelbroek et al. | |
| 2016/0236362 | A1 | 8/2016 | Stapelbroek et al. | |
| 2016/0236363 | A1 | 8/2016 | Stapelbroek et al. | |
| 2016/0271814 | A1 | 9/2016 | Bennik et al. | |
| 2017/0028576 | A1 | 2/2017 | Sablatschan | |
| 2017/0050326 | A1 | 2/2017 | Lau | |
| 2017/0113361 | A1 | 4/2017 | Feijen et al. | |
| 2017/0144319 | A1 | 5/2017 | Sablatschan | |
| 2017/0190063 | A1 | 7/2017 | Schratter et al. | |
| 2017/0246751 | A1 | 8/2017 | Vredeveld et al. | |
| 2017/0259439 | A1 | 9/2017 | Van Eibergen Santhagens et al. | |
| 2018/0009121 | A1 | 1/2018 | Stapelbroek et al. | |
| 2018/0085945 | A1 | 3/2018 | Bady et al. | |
| 2018/0099427 | A1 | 4/2018 | Huisman et al. | |
| 2018/0104834 | A1 | 4/2018 | Zuidervaart et al. | |
| 2018/0257248 | A1 | 9/2018 | Wu | |
| 2020/0164533 | A1 | 5/2020 | Phoon | |
| 2020/0316793 | A1 | 10/2020 | Phoon | |
| 2020/0316794 | A1 | 10/2020 | Phoon | |
| 2020/0331157 | A1 | 10/2020 | Godlieb et al. | |
| 2020/0376695 | A1 | 12/2020 | Feijen et al. | |
| 2021/0260781 | A1 | 8/2021 | Koeppl et al. | |
| 2021/0260783 | A1 | 8/2021 | Koeppl et al. | |
| 2021/0347069 | A1 | 11/2021 | Röder et al. | |
| 2021/0347070 | A1 | 11/2021 | Röder et al. | |
| 2021/0347071 | A1 | 11/2021 | Xu et al. | |
| 2021/0347072 | A1 | 11/2021 | Xu et al. | |
| 2021/0347076 | A1 | 11/2021 | Xu et al. | |
| 2022/0323353 | A1 | 10/2022 | Afonina et al. | |
| 2022/0339811 | A1 | 10/2022 | Woo | |
| 2023/0019742 | A1 | 1/2023 | Xu et al. | |
| 2024/0139980 | A1 | 5/2024 | Koeppl | |
| 2025/0065519 | A1 | 2/2025 | Koeppl et al. | |

FOREIGN PATENT DOCUMENTS

| | | | |
|---|---|---|---|
| CN | 1034327 | A | 8/1989 |
| CN | 1525902 | A | 9/2004 |
| CN | 201471463 | U | 5/2010 |
| CN | 102328321 | A | 1/2012 |
| CN | 102553474 | A | 7/2012 |
| CN | 103079779 | A | 5/2013 |
| CN | 103468914 | A | 12/2013 |
| CN | 203765658 | U | 8/2014 |
| CN | 104245253 | A | 12/2014 |
| CN | 104999486 | A | 10/2015 |
| CN | 206105917 | U | 4/2017 |
| CN | 206 287 174 | | 6/2017 |
| CN | 206633052 | U | 11/2017 |
| CN | 107639657 | A | 1/2018 |
| CN | 207139864 | U | 3/2018 |
| CN | 108724253 | A | 11/2018 |
| CN | 108858297 | A | 11/2018 |
| CN | 109789585 | A | 5/2019 |
| CN | 208914177 | U | 5/2019 |
| CN | 110 091 364 | | 8/2019 |
| CN | 209364682 | U | 9/2019 |
| CN | 209682252 | U | 11/2019 |
| CN | 110562534 | A | 12/2019 |
| DE | 622922 | C | 12/1935 |
| DE | 202008002467 | U1 | 4/2008 |
| DE | 202013103187 | U1 | 7/2013 |
| EP | 0070489 | A1 | 1/1983 |
| EP | 0282117 | A1 | 9/1988 |
| EP | 0652084 | A1 | 5/1995 |
| EP | 0652085 | A1 | 5/1995 |
| EP | 1930135 | A1 | 6/2008 |
| EP | 2 085 195 | | 8/2009 |
| EP | 2085194 | A1 | 8/2009 |
| EP | 2845476 | A1 | 3/2015 |
| EP | 2857154 | A1 | 4/2015 |
| EP | 3090844 | A1 | 11/2016 |
| EP | 3388207 | A1 | 10/2018 |
| EP | 3415288 | A1 | 12/2018 |
| EP | 3466619 | A1 | 4/2019 |
| EP | 3900896 | A1 | 10/2021 |
| GB | 1300020 | A | 12/1972 |
| GB | 1361836 | A | 7/1974 |
| GB | 2517938 | A | 3/2015 |
| JP | S5030989 | A | 3/1975 |
| JP | S5492455 | A | 7/1979 |
| JP | 2005052556 | A | 3/2005 |
| JP | 2006230568 | A | 9/2006 |
| JP | 2007044300 | A | 2/2007 |
| JP | 2017127385 | A | 7/2017 |
| WO | 0051793 | A1 | 9/2000 |
| WO | 0058060 | A1 | 10/2000 |
| WO | 2009024900 | A1 | 2/2009 |
| WO | 2016042158 | A1 | 3/2016 |
| WO | 2016134979 | A1 | 9/2016 |
| WO | 2016184874 | A1 | 11/2016 |
| WO | 2019110335 | A1 | 6/2019 |

OTHER PUBLICATIONS

Extended EP Search Report and Written Opinion for 21153295.7 dated Jun. 17, 2021, 6 pages.

(56) References Cited

OTHER PUBLICATIONS

Extended EP Search Report and Written Opinion for 21153290.8 dated Jun. 17, 2021, 10 pages.
All Office Actions, U.S. Appl. No. 17/157,858.
All Office Actions, U.S. Appl. No. 17/157,862.
All Office Actions, U.S. Appl. No. 17/157,869.
All Office Actions, U.S. Appl. No. 17/157,879.
All Office Actions, U.S. Appl. No. 17/157,883.
All Office Actions, U.S. Appl. No. 17/157,889.
All Office Actions, U.S. Appl. No. 17/157,895.
All Office Actions, U.S. Appl. No. 17/157,901.
Extended European Search Report and Search Opinion: Application No. 20153389.0; dated Nov. 19, 2020; 12 pages.
International Search Report and Written Opinion; Application Ser. No. PCT/IB2021/050560; dated Apr. 7, 2021, 17 pages.
International Search Report and Written Opinion: Application Ser. No. PCT/IB2021/050562; dated Apr. 19, 2021, 22 pages.
International Search Report and Written Opinion; Application Ser. No. PCT/IB2021/050563; dated Apr. 19, 2021, 19 pages.
U.S. Appl. No. 17/157,858, filed Jan. 25, 2021, to Koeppl Alois et al.
U.S. Appl. No. 17/157,862, filed Jan. 25, 2021, to Koeppl Alois et al.
U.S. Appl. No. 17/157,869, filed Jan. 25, 2021, to Koeppl Alois et al.
U.S. Appl. No. 17/157,879, filed Jan. 25. 2021, to Koeppl Alois et al.
U.S. Appl. No. 17/157,883, filed Jan. 25, 2021, to Koeppl Alois et al.
U.S. Appl. No. 17/157,889, filed Jan. 25, 2021, to Koeppl Alois et al.
U.S. Appl. No. 17/157,895, filed Jan. 25, 2021, to Koeppl Alois et al.
U.S. Appl. No. 17/157,901, filed Jan. 25, 2021, to Koeppl Alois et al.

* cited by examiner

ELECTRIC BEARD TRIMMER

FIELD OF THE INVENTION

The present invention relates to cutting body hair such as beard stubbles of multidays' beard. More particularly, the present invention relates to a cutter system for an electric shaver and/or trimmer, comprising a pair of comb-like cutting elements each with at least one row of cutting teeth and movable relative to each other, wherein one of said cutting elements has thickened and/or rounded tooth tips overhanging the tooth tips of the other cutting element. The present invention also relates to a method of manufacturing such cutter system and an electric shaver and/or trimmer provided with such a cutter system.

BACKGROUND OF THE INVENTION

Electric shavers and trimmers utilize various mechanisms to provide hair cutting functionality. Some electric shavers include a perforated shear foil cooperating with an under-cutter movable relative thereto so as to cut hairs entering the perforations in the shear foil. Such shear foil type shavers are often used on a daily basis to provide for a clean shave wherein short beard stubbles are cut immediately at the skin surface.

On the other hand, other cutter systems including a pair of cooperating comb-like cutting elements with a plurality of comb-like or rake-like cutting teeth reciprocating or rotating relative to each other, are often used for cutting longer beard stubbles or problem hair that is difficult to cut due to, for example, a very small angle to the skin or growing from very resilient skin. The teeth of such comb-like or rake-like cutting elements usually project substantially parallel to each other or substantially radially, depending on the type of driving motion, and may cut hairs entering into the gaps between the cutting teeth, wherein cutting or shearing is achieved in a scissor-like way when the cutting teeth of the cooperating elements close the gap between the finger-like cutting teeth and pass over each other.

Such cutter systems for longer hairs may be integrated into electric shavers or trimmers which at the same time may be provided with the aforementioned shear foil cutters. For example, the comb-like cutting elements may be arranged, for example, between a pair of shear foil cutters or may be arranged at a separate, extendable long hair cutter. On the other hand, there are also electric shavers or trimmers or styling apparatus which are provided only with such comb-like cutting elements.

For example, EP 24 25 938 B1 shows a shaver with a pair of long hair trimmers integrated between shear foil cutters. Furthermore, EP 27 47 958 B1 discloses a hair trimmer having two rows of cooperating cutting teeth arranged at opposite sides of the shaver head, wherein the cutting teeth of the upper comb-like cutting element are provided with rounded and thickened tooth tips overhanging the tooth tips of the lower cutting element so as to prevent the projecting tooth tips from piercing into the skin and from irritating the skin. A similar cutter system is shown in US 2017/0050326 A1 wherein in such cutter system the lower comb-like cutting element is fixed and the upper comb-like cutting element is movable.

Furthermore, CN 206 287 174 U discloses a beard trimmer having a pair of cooperating comb-like cutting elements each of which is provided with two rows of projecting cutting teeth, wherein the upper cutting element defining the skin contact surface has cutting teeth provided with thickened and rounded tooth tips overhanging the teeth of the lower cutting element. Said thickened and rounded tooth tips are curved away from the skin contact surface and do not protrude towards the skin contact surface so as to have the skin indeed directly contact the main portion of the cutting teeth to cut the beard stubbles close to the skin surface.

Such beard stubble trimmers need to address quite different and diverging functional requirements and performance issues such as closeness, thoroughness, good visibility of the cutting location, efficiency and pleasant skin feel, good ergonomics and handling. Closeness means short or very short remaining stubbles, whereas thoroughness means less missed hairs particularly in problem areas like the neck. Efficiency means less and faster strokes suffice to achieve the desired trimming result. Pleasant skin feel depends on the individual user, but often includes less irritation in form of nicks, cuts or abrasion and better gliding onto the skin. Visibility of the cutting location is particularly important in case of styling or edging contours to accomplish hair removal with a local accuracy of the magnitude of, for example, 1 mm.

Fulfilling such various performance issues at the same time is quite difficult. For example, rounded tooth tips with thickened end portions as shown in EP 27 47 958 B1 may prevent skin irritations, but do not allow for a more aggressive, closer shave. On the other hand, cutter systems with relatively sharp tooth tips at the upper driven comb as shown in US 2017/0050326 A1 may achieve closeness, but cannot be used to cut contours with the projecting teeth substantially perpendicular to the skin surface without causing skin irritations.

SUMMARY OF THE INVENTION

It is an objective underlying the present invention to provide for an improved cutter system avoiding at least one of the disadvantages of the prior art and/or further developing the existing solutions. A more particular objective underlying the invention is to provide for a close and thorough cutting of longer stubbles and hair including a good control of edging contours and, at the same time, avoiding skin irritations. Another objective underlying the present invention is a reliable and clean cutting action of the cooperating cutting teeth to avoid pulling and tugging of hair, without sacrificing low friction between the cutting elements, low temperatures of the cutting teeth and low energy consumption and thus long energy storage life.

According to an aspect, closeness and thoroughness of the cutting action may be combined with a pleasant skin feel avoiding skin irritations, by means of a two-step rounding of the overhanging tooth tips including a spherical or drop shaped or pearl-shaped thickening and a bent or curved tooth portion connecting said thickening to a main tooth portion and bent or curved away from the skin contact surface of said main tooth portion. A concave or flattened depression is formed in the transitional section between said thickening and said bent or curved tooth portion on the skin contact side of the teeth. Bending the teeth away from the skin contact surface in addition to the provision of a substantially spherical or drop shaped thickening at the outermost tip portion reliably prevents skin piercing and skin irritations even when using smaller sized thickening and/or rounding contours, but nevertheless allows for closeness and thoroughness of the cutting action. More particularly, the substantially spherical thickening may form the very outermost tip portion, wherein a more inwardly positioned tip portion neighboring said thickening may be bent away from the skin surface of the main tooth portion. Said more inwardly positioned tip portion is still part of the tooth tip, but is not yet part of the thickening and may have a substantially flat, plate-like configuration with a thickness comparable to or the same as the inner portions or main portion of the cutting tooth. The term "bent" in this and the following context means that the contour of the tooth close to the tip is curved and only optionally but not necessarily may also refer to the process of bending the tip area in order to create the curved or bent shape.

According to another aspect, the rounded, overhanging tooth tips may include a composite thickening including an outer shell surrounding an inner core, said outer shell and said inner core being made from different materials. In particular, said outer shell may be made from metal, whereas the inner core may be made from a non-metallic or polymer material so as to achieve a light-weight, rigid tooth tip structure having a high resistance against wear and tear.

These and other advantages become more apparent from the following description giving reference to the drawings and possible examples.

DETAILED DESCRIPTION OF THE INVENTION

Figure 1A:
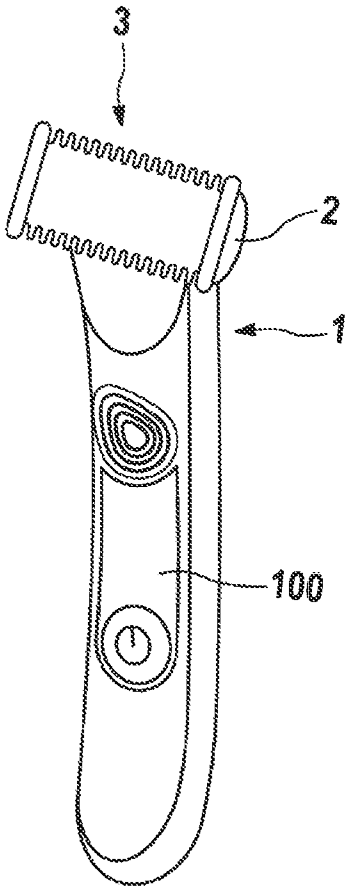
FIGS. 1*a*-1*b*: perspective views of an electric beard trimmer including a cutting system with a pair of cooperating comb-like cutting elements reciprocating relative to each other, wherein partial view (a) shows a front side of the electric beard trimmer and partial view (b) shows the beard trimmer working on a chin.

So as to combine closeness and thoroughness of the cutting action with good protection against skin irritations, the overhanging tooth tips may be provided with a two-step rounding including a spherical or drop-shaped or pearl-shaped thickening and a bent or curved portion connecting said thickening to a main portion of the corresponding tooth and bent or curved away from the skin contact surface of said main tooth portion, wherein a slight depression may be formed in the transition section between the spherical or pearl-shaped thickening and said bent or curved portion. Such double-rounded configuration including the rounding of the thickening and the curved or bent configuration of the neighboring tooth portion to which the thickening is attached, may combine closeness and thoroughness of the cutting action with a pleasant skin feel avoiding skin irritations. More particularly, bending the teeth away from the skin contact surface in addition to the provision of a substantially spherical and thus round thickening at the outermost tip portion reliably prevents skin piercing and skin irritations even when the thickening is of a smaller contour which, on the other hand, helps in achieving closeness and thoroughness.

Said two-step rounding and/or curving may include a concave section between the two rounded portions, more particularly a concave section between the spherical or pearl-shaped thickening and the neighboring curved portion. Considering a tangential line onto the skin contact surface of the end portions of the teeth, said tangential line contacts said spherical or pearl-shaped thickening on the one hand and the convex curved portion on the other hand, wherein between said two contact points of the imaginative tangential line the aforementioned concave section forms a gap to said tangential line. In other words, the transitional section between the thickening and the bent or curved portion includes some slack and/or a dint and/or a flattening on the skin contact side of the tooth. Said thickening and the bent or curved portion form basically convex skin contact surfaces, whereas the transitional section between said thickening and curved portion form a flattened or concave skin contact surface.

More particularly, the substantially spherical thickening may form the very outermost tip portion, wherein the neighboring, more inwardly positioned tip portion may be curved away from the skin contact surface of the main tooth portion. Said more inwardly positioned tip portion is still part of the tooth tip, but is not yet part of the thickening and may have a substantially flat, plate-like configuration with a thickness comparable to or the same as the inner portions or main portion of the cutting tooth.

Said inner or main portion of the cutting teeth providing for the cutting action due to the other, cooperating teeth closing the gap and passing, may have a substantially elongated, plate-like configuration with at least substantially parallel cutting edges formed by longitudinal edges of the tooth body. At the tip of such parallelepiped-like tooth main portion, the substantially spherical thickening may be attached forming the tip of the teeth.

In particular, the two-step rounding provides for excellent cutting performance when the cutter system is used in the rake mode as well as in the fork mode. When used in the fork mode, i.e. the teeth, with their main tooth portion, being substantially parallel to and/or tangential to and/or touching the skin, helps in keeping the skin wave small which skin wave is created when sliding the cutter system along the skin surface. Due to the bending of the tooth tip portion neighboring the thickening away from the skin contact surface, friction between the thickening and the skin can be reduced. On the other hand, when using the cutter system in the rake mode, i.e. positioning the cutting teeth, with their longitudinal axis, substantially perpendicular to the skin, the substantially spherical thickening guides the pair of cutting elements along the skin surface and achieves a substantially soft cutting procedure.

The bent teeth portion connecting the spherical thickenings to the main portion of the teeth, may be configured to have a radius of curvature or bending radius which is smaller than 400 μm. More particularly, the bending radius of said bend tooth portion may range from 200 to 400 μm or 250 to 350 μm.

The thickenings may have a diameter ranging from 300 to 550 μm or 350 to 500 μm.

So as to give the user the choice between a more aggressive, closer cutting action on the one hand and a less intensive, more pleasant skin feel on the other hand, the cutter system provides for two separate rows of cooperating teeth which are different from each other in terms of shape and/or size and/or positioning of the thickened and/or rounded tooth tips of the teeth. Thus, using a first row of cooperating cutting teeth may provide for a more aggressive, closer cutting action, whereas using a second row of cutting teeth may provide for a less intensive, more pleasant skin feel. The configuration of the tooth tips, in particular the configuration of the curvature and thickening thereof may considerably influence the cutting performance and allow the user to choose between closeness, thoroughness, soft skin feel and efficiency. Due to the at least two rows of cooperating teeth having tooth tips configured differently aggressive, versatility of the cutter system is significantly increased.

More particularly, the rows of cooperating teeth may differ from each other in terms of the height of the tooth tips which is, at least in part, defined by the position of the thickening relative to the main portion of the teeth and the size and shape thereof. At one row, the thickening may protrude only to the side opposite to the skin contact surface what may be achieved, for example, by bending or curving the teeth portions at which the tip thickenings are attached, away from the skin contact surface and/or attaching the thickening to the main portion of the teeth in an eccentric way, in particular a bit offset away from the skin contact surface. On the other hand, at a second row of cooperating teeth, the thickenings at the tooth tips may protrude to both sides of the teeth, i.e. to the skin contact surface and to the side opposite thereto.

In a more general way, the asymmetric design of the cutting teeth rows may be achieved in that the overhanging tooth tips at one row of cutting teeth protrude from the skin contact surface of a main portion of the cutting teeth towards the skin to be contacted further than the overhanging tooth tips at the other row of cutting teeth. In addition or in the alternative, the overhanging tooth tips at said other row of cutting teeth may be positioned further away from the skin contact surface of the main portion of the cutting teeth than the overhanging tooth tips of said one row of cutting teeth.

So as to achieve a sort of protection against piercing of the tooth tips of the lower comb-like cutting element or undercutter, the upper cutting element may have tooth tips overhanging the tooth tips of the lower cutting element and protruding towards a plane in which the teeth of the lower cutting element are positioned so that the thickened tooth tips of the upper cutting element form a sort of barrier preventing the tooth tips of the lower cutting element to pierce into the skin. More particularly, the overhanging tooth tips of the upper cutting element may be thickened and/or curved such that said overhanging tooth tips extend into and/or beyond said plane in which the tooth tips of the other cutting element are positioned. Thus, said tooth tips of the other cutting element are hidden behind the overhanging tooth tips of the other cutting element when viewing onto the tips of the teeth of the cutting elements in a direction substantially parallel to the longitudinal axis of the protruding teeth.

Said asymmetric rows of cooperating teeth may differ in the heights of the teeth having the overhanging thickened and/or curved tooth tips. The height of the teeth may be measured substantially perpendicular to the skin contact surface of the main portion of the teeth and/or perpendicular to a longitudinal axis of the teeth, and may include the contour of the thickening at the tips and the upper and/or lower contour of the main portion of the teeth. When the thickening protrudes away from the skin contact surface and/or the teeth are curved away from said skin contact surface, the height may span from the lowest point of the thickening to the upper surface of the main portion of the teeth defining the skin contact surface thereof.

Such heights may differ from row to row. More particularly, at one row the height of the cutting teeth having the overhanging tooth tips may range from 300 to 600 μm or 350 to 550 μm, whereas the height at the other row may range from 200 to 500 μm or 250 to 450 μm.

More generally, heights between 200 and 550 μm may eliminate the risk of penetration when the cutting system is applied in parallel to the skin, i.e. with the skin contact surface of the main portion of the teeth touching the skin or parallel to the skin to be shaved.

The aforementioned thickenings may be shaped spherical or at least similar to a sphere such as drop-shape or pearl-shape, wherein a diameter—in case of a drop-shape or pearl-shape a minimum diameter—may range from 250 to 600 μm or 300 to 550 μm or 350 to 450 μm.

To give the rows of cooperating teeth asymmetrical configuration, the thickenings of the overhanging tooth tips at one row may have a diameter ranging from 350 to 550 μm, whereas the diameter of the thickenings of the tooth tips at another row may range from 250 to 450 μm.

When the cutter system is used like a rake with the cooperating teeth extending substantially perpendicular to the skin to be shaved, it may be helpful to have a sufficiently long overhang of the thickened and/or rounded tooth tips of the standing, not reciprocating or not rotating cutting element to prevent the reciprocating or rotating teeth of the other cutting element from touching and irritating the skin. Such overhanging length defining the length of protrusion of the overhanging tooth tips beyond the tooth tips of the other cutting element, may range from 400 to 800 μm or 400 to 600 μm.

So as to allow for a close cut, the teeth may have a rather reduced thickness and/or the thickness of the teeth may be adjusted to the gap between pairs of neighboring cutting teeth. Usually, the skin to be shaved bulges when the cutter system is pressed against the skin to be shaved. More particularly, the skin may bulge into the gaps between the cutting teeth which depress or dent the skin in contact with the teeth bodies. Due to such bulging effect of the skin, it may be advantageous to have a teeth thickness, at a main portion of the teeth providing the cutting action, ranging from 50 to 150 or 30 to 180 μm. In addition or in the alternative, the width of a gap between neighboring cutting teeth may have a gap width ranging from 150 to 550 or 200 to 500 μm. In addition or in the alternative, the teeth may have a width ranging from 200 to 600 μm or 250 to 550 μm.

The rows of teeth having different aggressiveness may be positioned on opposite sides of a cutter head and/or may look into opposite directions, i.e. may be open towards opposite directions so as to allow hair to enter into the gaps between the teeth when moving the cutter head into opposite directions.

More particularly, the cutter system may define a skin contact surface which is inclined at an acute angle relative to the longitudinal axis of the elongated handle of the cutting device so that one side of the skin contact surface slopes down towards a front side of the handle, whereas the opposite side of the skin contact surface essence towards the back side of the handle. Said front side of the handle may include, for example, an operation button for switching on and off the drive unit and/or may include a surface contour or portion adapted to a thumb gripping the handle. Said skin contact surface of the cutter system may form a sort of monopitch roof attached to one end of the handle. However, the skin contact surface does not have to be flat or planar, wherein, when said skin contact surface is convex and/or concave, a plane tangential to the skin contact surface may have the aforementioned inclination relative to the longitudinal axis of the handle. The row of teeth having the more aggressive configuration may be arranged at the lower side of said monopitch roof, i.e. at the side of the skin contact surface sloping down towards the front side of the handle, whereas the row of teeth configured less aggressive may be arranged at the opposite side, i.e. at the upper side of the monopitch roof or the side ascending towards the back side of the handle. Usually, when the skin contact surface is inclined to slope down towards the front side of the handle, the skin contact pressure at the sloped down side is lower than the skin contact pressure at the ascending side. Thus, the more aggressive teeth at the sloped down side having the lower skin contact pressure may achieve efficient hair cutting and catch difficult hair without skin irritations, since the low skin contact pressure is sort of compensating by the increased aggressiveness of the teeth configuration. On the other hand, the less aggressive teeth at the opposite, ascending side of the skin contact surface may compensate for the higher skin contact pressure there and to avoid skin irritations.

According to another aspect, the aggressiveness of the teeth may vary also within the same row of cooperating cutting teeth. More particularly, the cutting teeth in a middle section of a row may be different from cutting teeth in end sections of said row in terms of shape and/or size and/or position of the tooth tips so as to provide for a different level of aggressiveness. More particularly, in sections of relatively high skin contact pressure, the teeth may be configured to provide for reduced aggressiveness, whereas the teeth arranged in sections having relatively low skin contact pressure may be configured to provide for a higher level of aggressiveness.

The skin contact pressure may vary due to the contour of the skin contact surface of the cutter system. For example, when the skin contact surface of the cutter system is substantially flat and/or substantially planar and/or slightly concave, the skin contact pressure may increase towards the lateral end portions of the skin contact surface. Said lateral end portions mean the end portions in the direction of the reciprocating movement of the cutting teeth relative to each other. So as to achieve uniform cutting despite such varying skin contact pressure, the teeth positioned in the middle section having the lower skin contact pressure may be configured to have a higher aggressiveness what might be achieved by means of a smaller diameter of the rounded tooth tips and/or less curvature away from the skin contact surface. On the other hand, the teeth positioned in the end sections having higher skin contact pressure may be configured to provide for reduced aggressiveness what might be achieved by an increased diameter of the rounded tooth tips and/or more curvature away from the skin contact surface.

According to another aspect, the skin contact surface of the cutter system may have a convex contour when viewed in a cross-sectional plane parallel to the direction of reciprocating movement of the cooperating teeth relative to each other and perpendicular to the skin contact surface. In other words, the skin contact surface of the cutter system may slope down or may be curved away from the skin towards the lateral end portions towards which the teeth reciprocate. Due to such convex contour of the skin contact surface, the skin contact pressure may decrease from the center section of the cutter system towards the end portions thereof. So as to compensate for such varying skin contact pressure, the teeth in the lateral end sections may be configured to have an increased aggressiveness, whereas the teeth in a middle section may be configured less aggressive.

It may be sufficient to have three or four or five groups of teeth in a row having the aforementioned different configuration and different aggressiveness. On the other hand, the configuration of the teeth of a row may change step by step or continuously form the center of the row of teeth to the end portions thereof, wherein said change of the configuration may provide for a distribution of tooth configurations substantially symmetrical with regard to the center of the row of teeth. More particularly, the tooth aggressiveness may change step by step or continuously from the center of a row towards each of the end sections thereof.

Another sort of asymmetrical contouring may be provided at the side edges of the skin contact surface of each tooth or at least a group of teeth. More particularly, the teeth which may have a finger-like shape, have skin contact surfaces which may have rounded and/or beveled edges, wherein the degree or level or rounding and/or beveling may vary along the longitudinal axis of the teeth.

More particularly, the rounding and/or beveling of the skin contact surface edges may be more pronounced and/or larger at a base section or root section of the teeth than the rounding and/or beveling at a middle section and/or a projecting teeth section close to the tooth tips. Usually, the skin contact pressure decreases towards the base section or root section of the teeth so the increased rounding and/or beveling of the edges of the skin contact surface of the teeth may allow the skin to sufficiently bulge into the gap between the teeth despite the decreased skin contact pressure. Thus, an efficient hair cutting and closeness can be achieved over the entire length of the cutting teeth.

Said rounding and/or beveling of the edges of the skin contact surface of the teeth also may vary along the length of a row of teeth so that in a middle section of the row the rounding and/or beveling of the edges of the skin contact surface of the teeth may be different from the rounding and/or beveling of the skin contact surface of the teeth in end sections of a row of teeth. In particular, the rounding and/or beveling may be larger and/or more pronounced in sections of the row where the skin contact pressure is lower, whereas the rounding and/or beveling may be smaller in sections where the skin contact pressure is higher.

So as to achieve a light-weight, but still rigid tooth tip structure resistive against wear and tear, the tooth tips may have composite thickenings including an outer shell surrounding an inner core, said shell and core being made from different materials.

The cutter system may be provided with said overhanging rounded tooth tips which may include a composite thickening which may include an outer shell surrounding an inner core, said shell and said core being made from different materials.

Said shell can be made from metal and said core can be made from a non-metallic material.

Said outer shell may surround said inner core at three sides thereof, wherein the inner core can be uncovered and visible from two opposite sides which are facing neighboring teeth.

Said outer shell can be plate-shaped and curved by more than 1000 or more than 150°, in particular U-shaped.

Said outer shell may have three open sides, wherein first and second open sides may be opposite to each other and face neighboring teeth and a third open side may face the tooth tip of the other cutting element.

The inner core may have a diameter or thickness ranging from 50% to 250% or 75% to 125% of the wall thickness of the outer shell.

According to another aspect, the comb-like cutting elements may be manufactured by bending the teeth about an axis parallel to the row of teeth before the thickenings are formed at the tooth tips.

The comb-like cutting elements may be manufactured by use of different processing techniques. More particularly, the toothed cutting edges including the teeth and the gaps therebetween may be formed by edging and/or electro-chemical machining and/or pulsed electro-chemical machining. In addition or in the alternative, the teeth and/or the gaps therebetween may be formed by e-polishing or electro-polishing to remove material from the cutting element body, reducing the surface roughness by leveling micro-peaks and valleys to improve the surface finish. The cutting element may be immersed in a bath of electrolyte and may be connected to a terminal of a power supply to pass a current to the cutting element where metal on the surface may be oxidized and dissolved in the electrolyte. Furthermore, in addition or in the alternative, stamping and/or grinding may be used to form the cutting element.

In addition or in the alternative, the substantially spherical thickenings at the tooth tips may be formed by laser melting. In addition or in the alternative, stamping and/or embossing and/or injection molding and/or dipping and/or coating may be used to form said thickenings.

Basically, each of the cooperating cutting elements may be driven. However, to combine an easy drive system with safe and soft cutting action, the upper or outer cutting element having the skin contact surface and/or the overhanging tooth tips may be standing and/or may be not reciprocating and not rotating, whereas the lower cutting element which may be the sandwiched cutting element, may reciprocate or rotatorily oscillate.

Figure 1B:
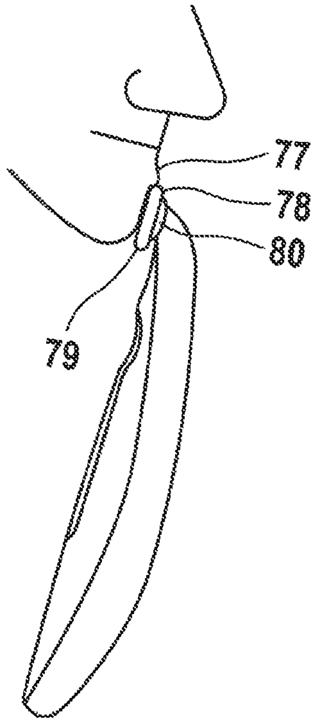

As can be seen from FIG. 1, the cutter system 3 may be part of a cutter head 2 which may be attached to a handle 100 of a shaver and/or trimmer 1. More particularly, the shaver and/or trimmer 1 may include an elongated handle 100 accommodating the electronic and/or electric components such as a control unit, an electric drive motor or a magnetic drive motor and a drive train for transmitting the driving action of the motor to the cutter system at the cutter head 2 which cutter head 2 may be positioned at one end of the elongated handle 100, cf. FIG. 1.

The cutter system 3 including a pair of cooperating cutting elements 4 and 5 may be the only cutter system of the cutter head 2 as it is the case with the example shown in FIG. 1. On the other hand, the cutter system 3 may be incorporated into a shaver head 2 having other cutter systems such as shear foil cutters, wherein, for example, the cutter system 3 having at least one row of cooperating cutting teeth 6, 7 may be positioned between a pair of shear foil cutters, or, in the alternative, may be positioned in front of such a shear foil cutter.

As shown by FIG. 1, the cutter system 3 may include elongated rows of cutting teeth 6 and 7 which may reciprocate relative to each other along a linear path so as to effect the cutting action by closing the gaps between the teeth and passing over each other. On the other hand, the cutter system 3 also may include cutting teeth 6 and 7 which are aligned along a circle and/or are arranged radially. Such rotatory cutting elements 4 and 5 may have cutting teeth 6 and 7 projecting substantially radially, wherein the cutting elements 4 and 5 may be driven to rotate relative to each other and/or to rotatorily oscillate relative to each other. The cutting action is basically similar to reciprocating cutting elements as the radially extending teeth, when rotating and/or rotatorily oscillating, cyclically close and reopen the gap between neighboring teeth and pass over each other like a scissor.

Figure 2:
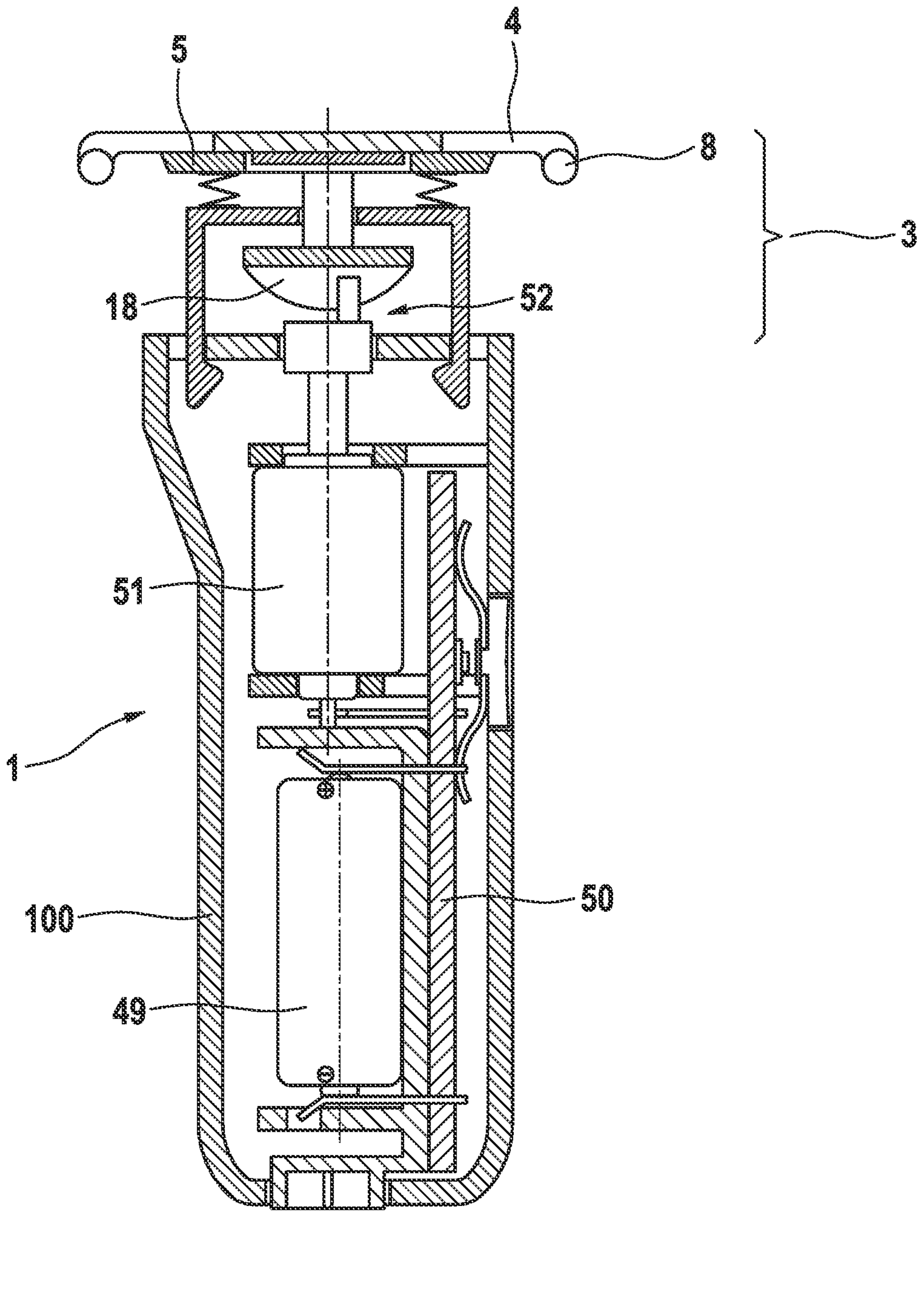
FIG. 2: a cross sectional view of the beard trimmer showing the cooperating comb-like cutting elements and the drive system for driving said cutting elements.

As shown by FIG. 2, the drive system may include a motor the shaft of which may rotate an eccentric drive pin which is received between the channel-like contours of a driver 18 which is connected to one of the cutting elements 4 which is caused to reciprocate due to the engagement of the rotating eccentric drive pin with the contours of said driver 18.

Figure 3:
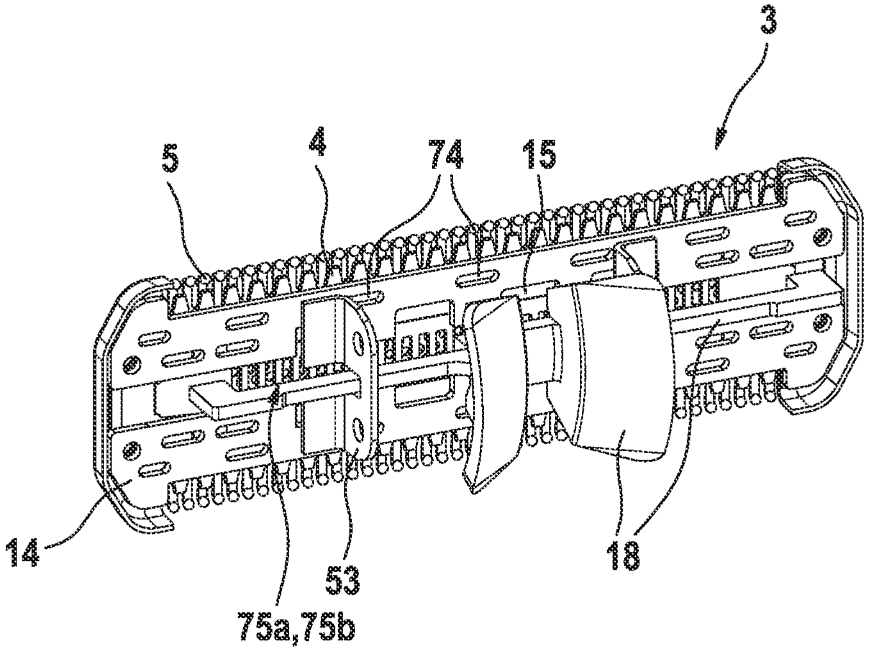
FIG. 3: a perspective view of the cutter system including the pair of cooperating comb-like cutting elements and the support structure for supporting the cutting elements relative to each other.
Figure 8A:
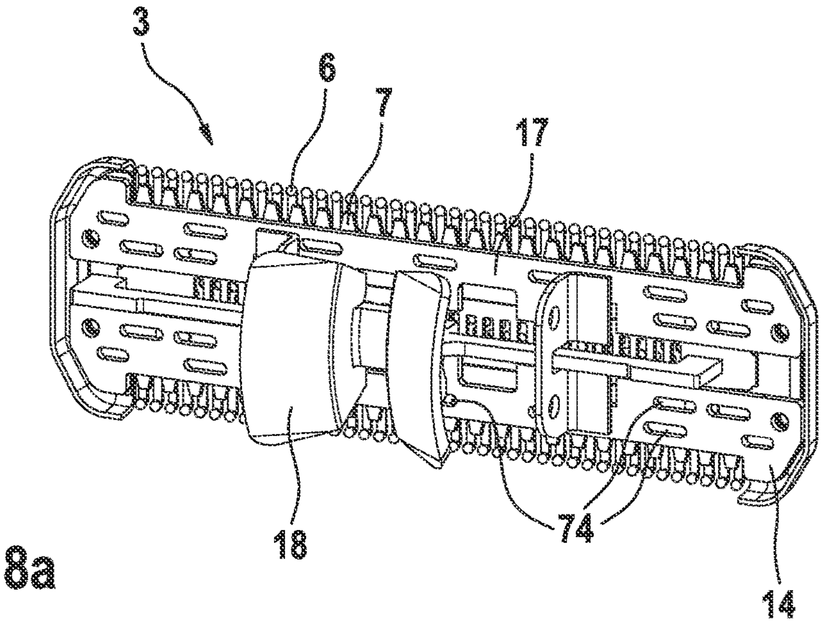
FIGS. 8*a*-8*g*: shows the cutter system including the cooperating cutting elements in differently assembled/exploded views, wherein view (a) shows the assembled cutting system in a perspective view, view (b) shows an exploded view of the cutter system illustrating the spacer between the support element and the upper cutting element to define a gap for receiving the sandwiched cutting element, view (c) shows a partly exploded view of the cutting system with the spacer being attached to the support element, and view (d) shows a partly exploded view showing the sandwiched cutting element assembled with the spacer, view (e) shows a partial, perspective view of the skin contact surface of the teeth with rounded and/or beveled edges, view (f) shows a top view of the skin contact surface of the teeth with the rounded and/or beveled edges, and view (g) shows two cross-sectional views of the rounding and/or beveling of the edges of the skin contact surfaces of the teeth taken at different length portions of the teeth as indicated in partial view 8*f* to illustrate the teeth cross-section varying along the teeth longitudinal axis.
Figure 8B:
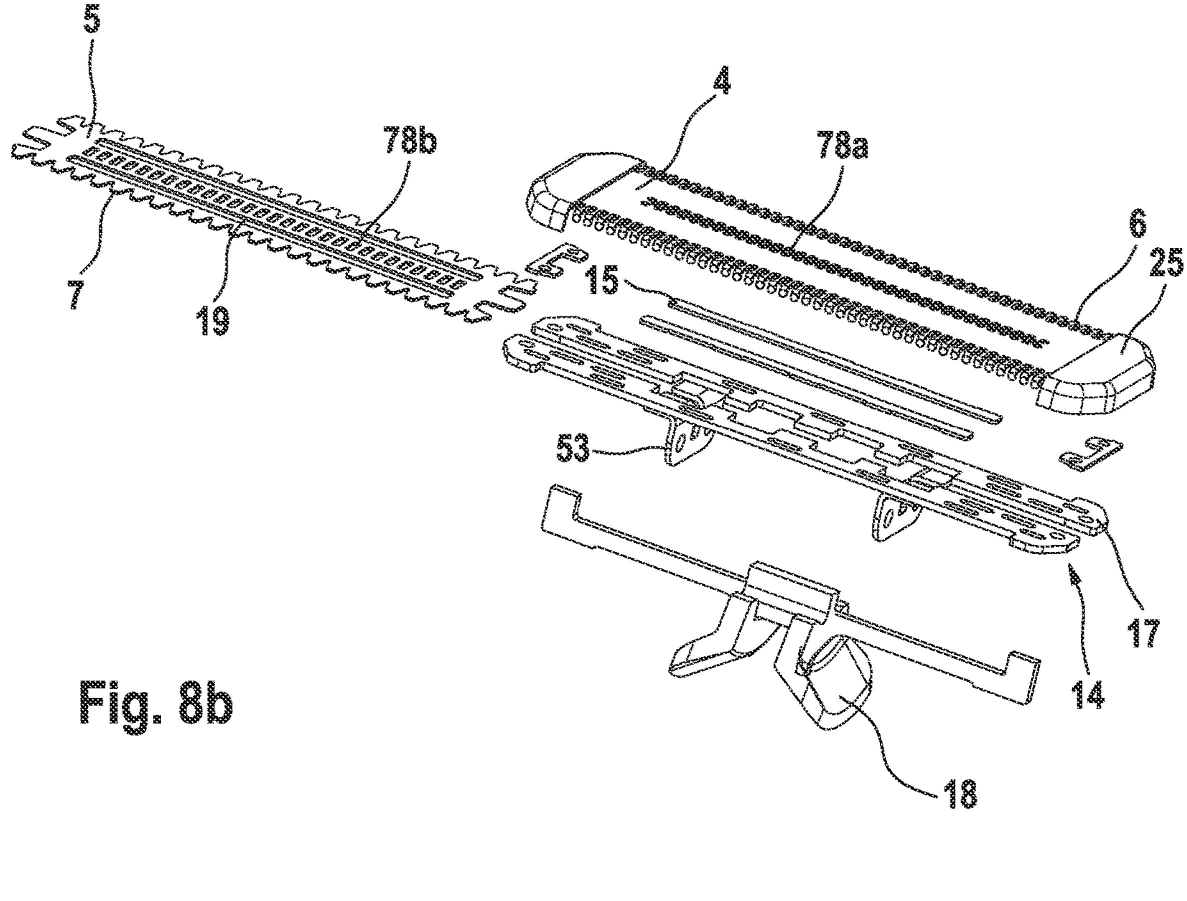
Figure 10A:
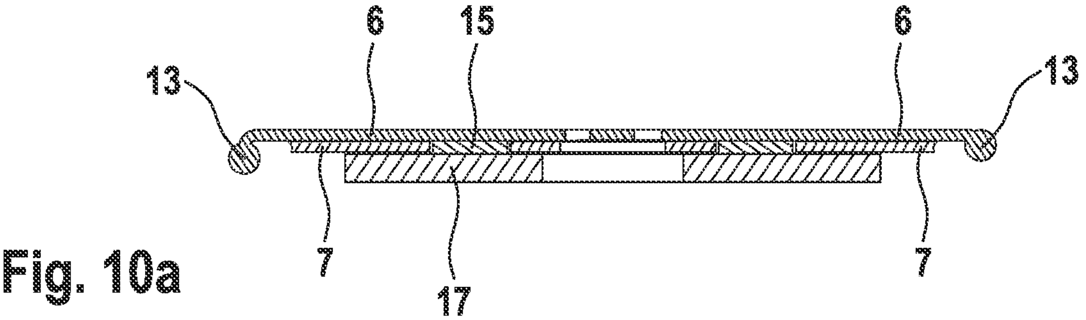
FIGS. 10*a*-10*c*: a cross sectional view of the support structure including a spacer for defining a gap receiving the sandwiched cutting element which gap is slightly thicker than the sandwiched cutting element.
Figure 10B:
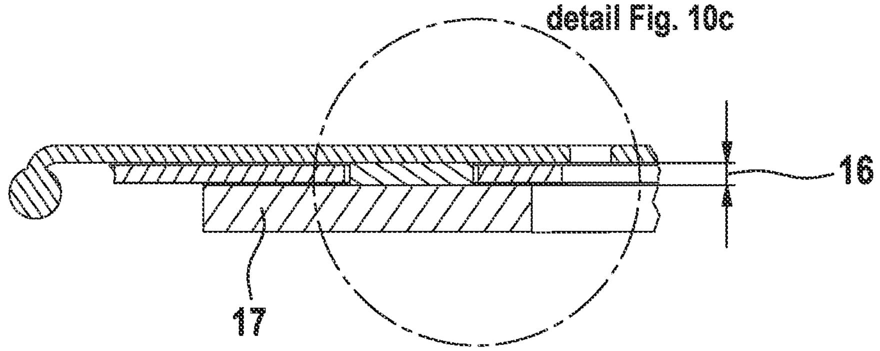
Figure 10C:
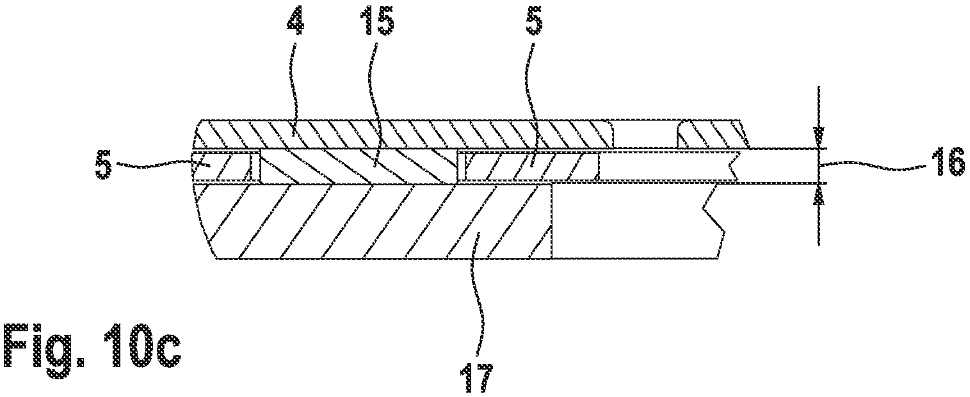

As shown by FIGS. 3, 8 and 10, the cooperating cutting elements 4 and 5 basically may have—at least roughly—a plate-shaped configuration, wherein each cutting element 4 and 5 includes two rows of cutting teeth 6 and 7 which may be arranged at opposite longitudinal sides of the plate-like cutting elements 4 and 5, cf. FIG. 8*b* and FIG. 10*a*. The cutting elements 4 and 5 are supported and positioned with their flat sides lying onto one another. More particularly, the cutting teeth 6 and 7 of the cutting elements 4 and 5 touch each other back to back like the blades of a scissor.

So as to support the cutting elements 4 and 5 in said position relative to each other, but still allowing reciprocating movement of the teeth relative to each other, the cutting element 5 is sandwiched between the other cutting element 4 and a support structure 14 which may include a frame-like or plate-like support element 17 which may be rigidly connected to the upper or outer cutting element 4 to define a gap 16 therebetween in which gap 16 the sandwiched cutting element 5 is movably received.

Figure 8C:
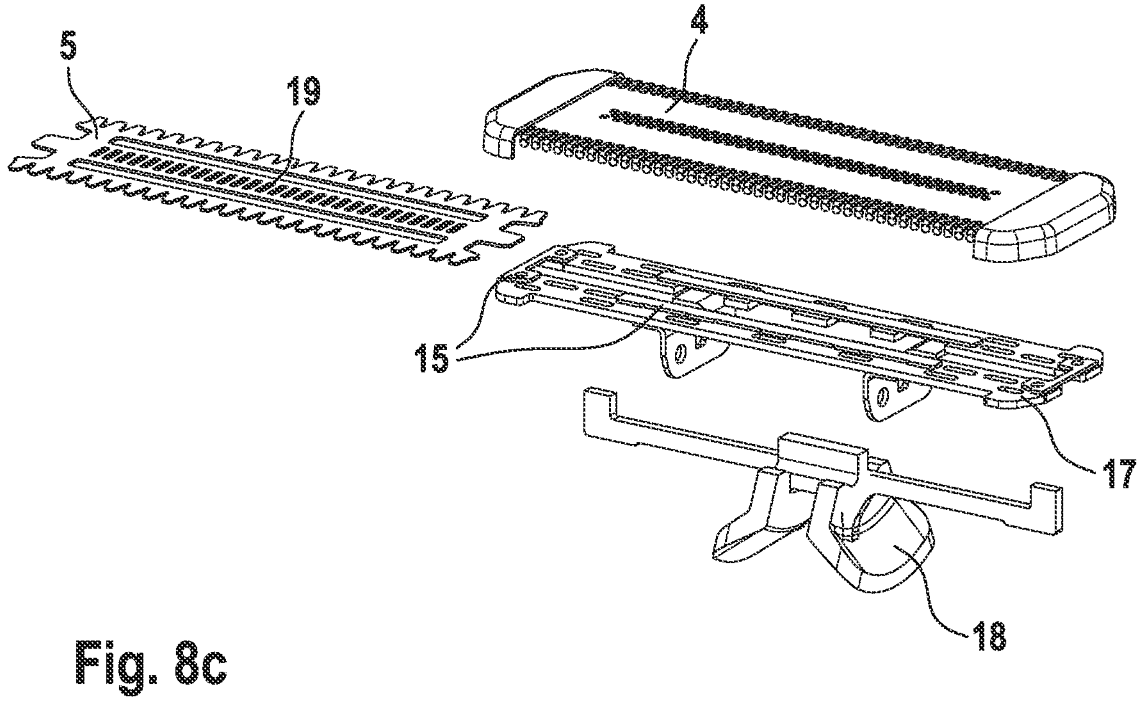
Figure 8D:
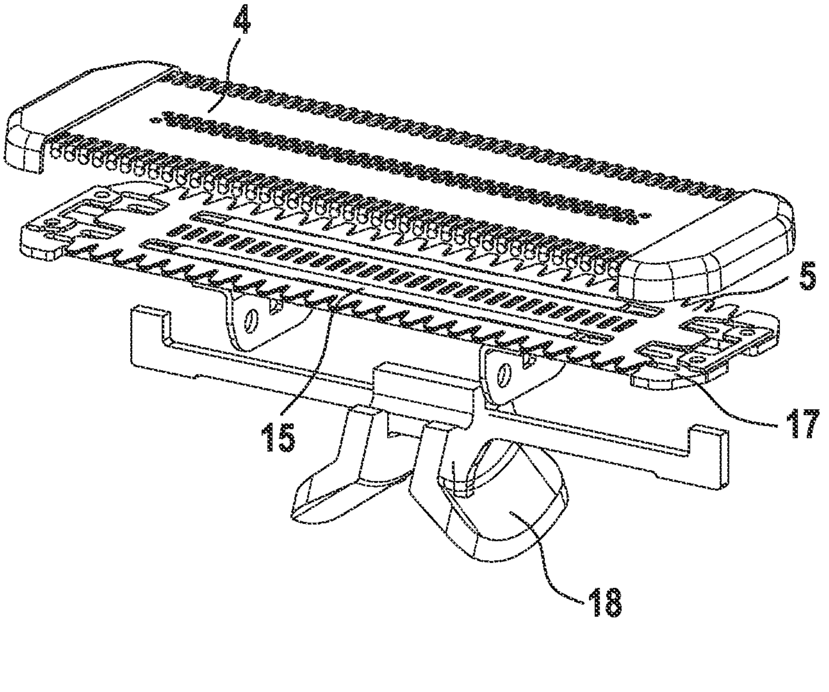
Figure 8G:
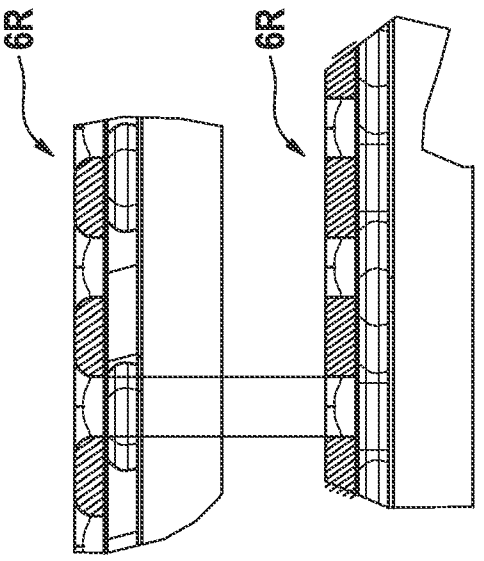
Figure 8F:
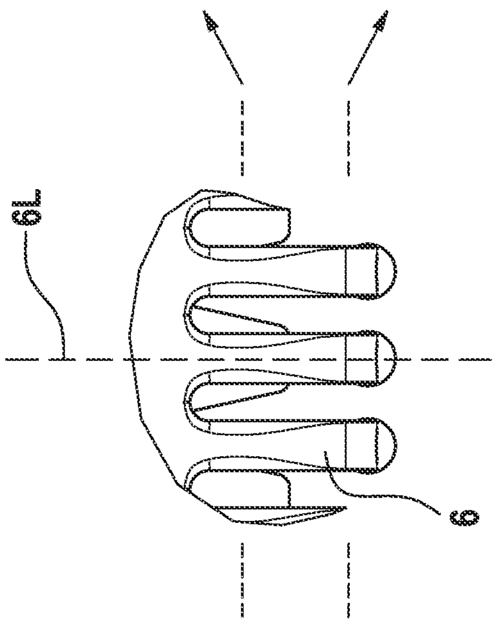
Figure 8E:
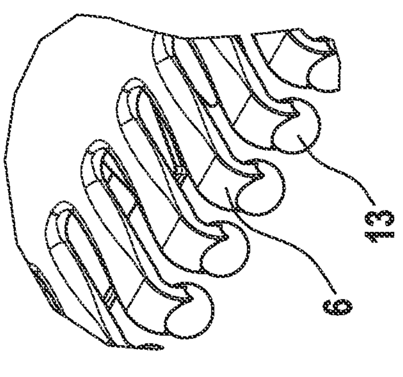

As can be seen from FIGS. 8*b*, 8*c* and 8*d*, a spacer 15 is accommodated between the support element 17 and the upper cutting element 4 so as to precisely define the width or thickness of said gap 16. Said spacer 15 may be plate-shaped to precisely adjust the distance between the support element 17 and the cutting element 4.

More particularly, said spacer 15 may be located in the center of gap 16 so that, on the one hand, gap 16 is ring-shaped and/or surrounds said spacer 15 and, on the other hand, the distance between the cutting element 4 and the support element 17 is controlled at all sides due to the central location of said spacer 15.

The sandwiched cutting element 5 may include a recess 19 which may be formed as a throughhole going from one side to the other side of the cutting element 5 and in which said spacer 15 may be received. The contour, in particular the inner circumferential contour and/or the edges of said recess 19 may be adapted to the outer contour of the spacer 15 so that the cutting element 5 is guided along the spacer 15 when reciprocating. More particularly, the width of the spacer 15 may substantially correspond to the width of the recess 19 so that the cutting element 5 may slide along the longitudinal side edges of the spacer 15. The longitudinal axis of the elongated spacer 15 is coaxial with the reciprocating axis of the cutting element 5, cf. FIG. 8*d*.

The support element 17 which may be plate-shaped or formed as a frame extending in a plane, has a size and contour basically comparable to the cutting element 5 to be supported as can be seen from FIG. 8*b*, the support element 17 may have a substantially rectangular, plate-like shape supporting the cutting element 5 along lines or strips along the two rows 10 and 11 of cutting teeth 7, whereas the support element 17 may have a size and contour and/or configuration to support also at least a part of the teeth 7 of cutting element 5. In the alternative, the support element 17 may extend at least to the root of the teeth 7.

Figure 9B:
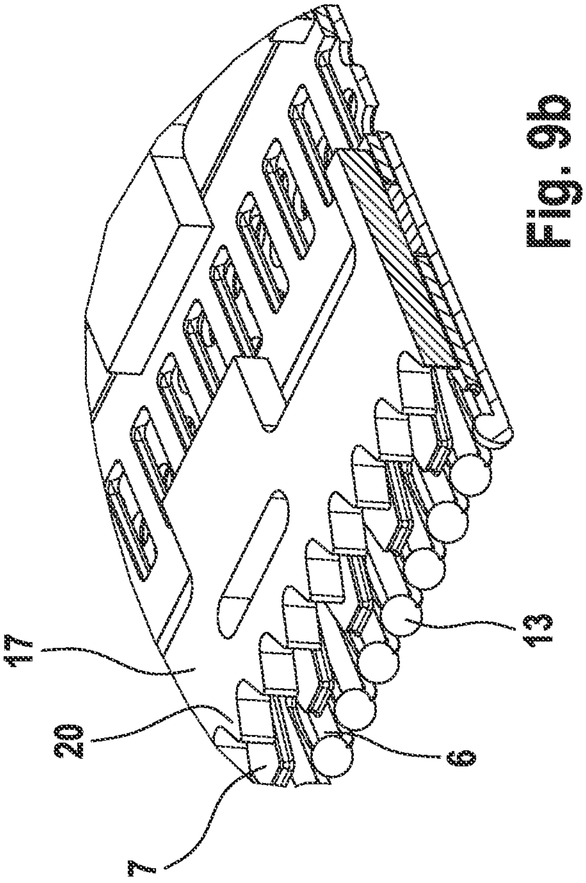
FIGS. 9*a*-9*c*: shows perspective views in part of the cooperating cutting teeth to illustrate the rounded, thickened tooth tips of the upper cutting element overhanging the cutting teeth of the sandwiched cutting element and to illustrate the support element holding the sandwiched cutting element closely at the upper cutting element, said support element having a wave- or teeth-shaped edge contour.
Figure 9C:
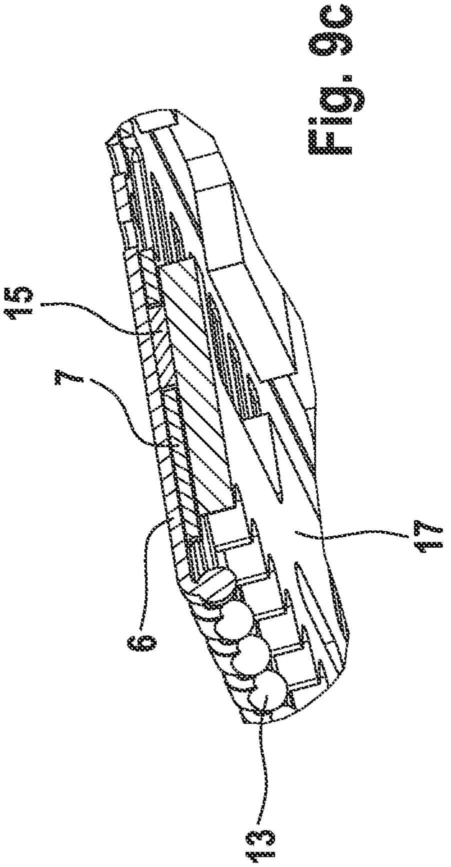
Figure 9A:
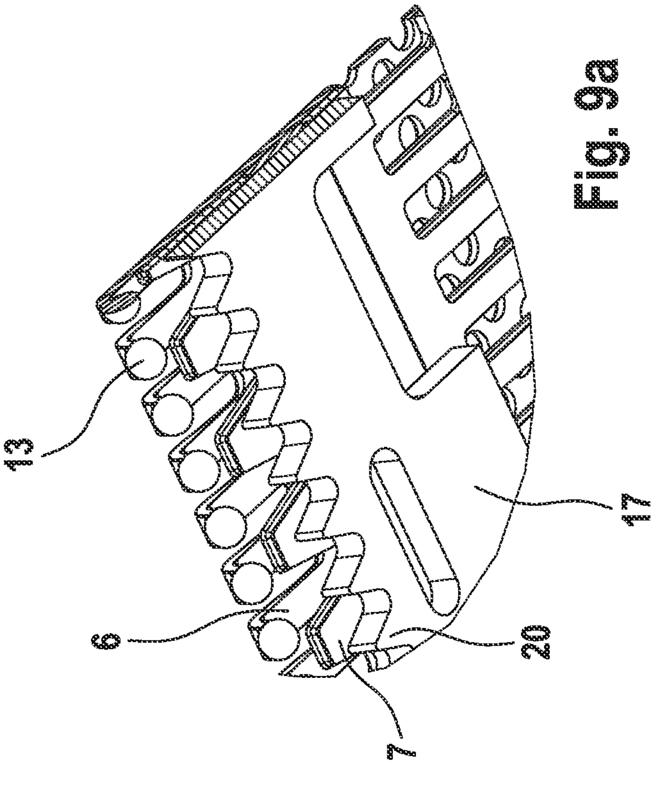

As can be seen from FIGS. 9*a* and 9*b*, the edge of the support element 17 extending along the row of teeth 7, may itself have a wave-shaped or teeth-like configuration with protrusions and gaps therebetween. The protrusions 20 extend towards the tips of the teeth 7 at positions where they can support said teeth 7. Due to the toothed configuration of the edge of the support element 17 including the gaps between the protrusions 20, hairs may properly enter into the gaps between the cooperating teeth even when the cutter system is used as a rake. Nevertheless, the protrusions 20 provide for a better support of the teeth 7 against deflection.

The support element 17 is rigidly held at a predetermined distance from the cutting element 4 so that the gap 16 therebetween has precisely the desired thickness. This is achieved by the aforementioned spacer 15 the thickness of which exactly defines the thickness of gap 16.

So as to avoid undesired friction and heat generation, but nevertheless keep the teeth 6 and 7 sufficiently close to each other to achieve reliable cutting of hairs, said spacer 15 may have a thickness which is slightly larger than the thickness of the sandwiched cutting element 5, wherein the amount by which the thickness of the spacer 15 exceeds the thickness of the cutting element 5 is smaller than the diameter of usual hair. More particularly, the thickness of the spacer 15 may be larger than the thickness of the sandwiched cutting element 5 by an amount ranging from 20 to 40 μm.

The support element 17, the spacer 15 and the cutting element 4 may be rigidly connected to each other, for example by means of snap fitting contours to allow changing the cutting element 4. In the alternative, also unreleasable fastening is possible, such as welding or gluing.

For example, the cutting element 4 may be rigidly fixed at the support element 17 at opposite ends thereof, for example by means of end portions 21 which may form lateral protection elements having rounded and/or chamfered contours for soft skin engagement. Such fixation at end portions may be provided in addition or in the alternative to fixation via the spacer 15.

Figure 11A:
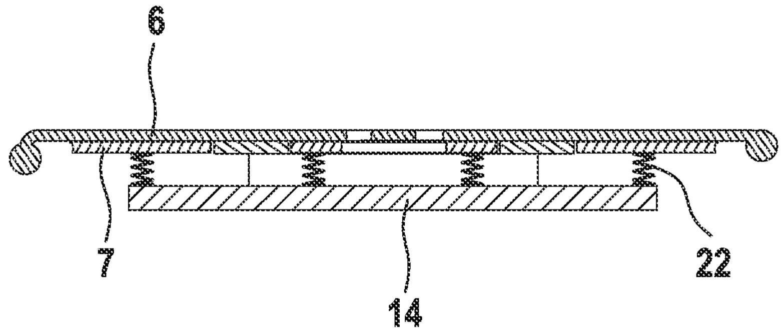
FIGS. 11*a*-11*b*: a cross sectional view of an alternative support structure including a spring device urging the sandwiched cutting element towards the upper cutting element to minimize a gap between the cooperating teeth.
Figure 11B:
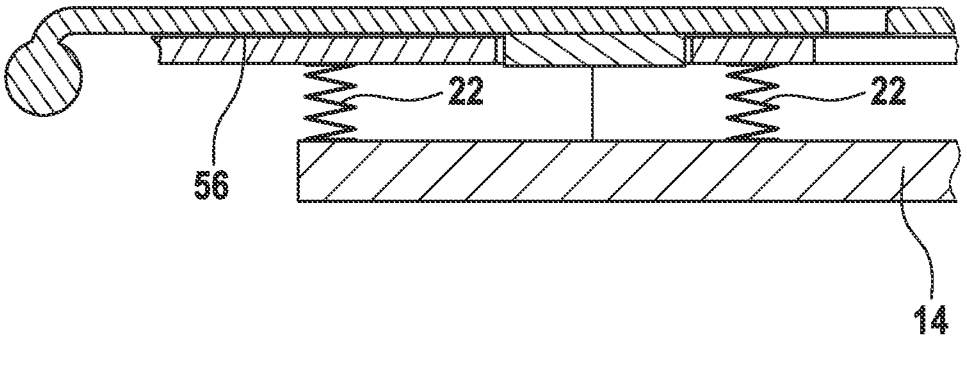

As can be seen from FIGS. 11*a* and 11*b*, the support structure 14 also may include a spring device 22 which may urge the cutting element 5 onto the cutting element 4 so as to avoid any gap between the cooperating teeth 6 and 7. Such spring device 21 may be provided between the support structure 14 and the lower or under cutting element 5 so as to press the cutting element 5 onto the cutting element 4.

Figure 4A:
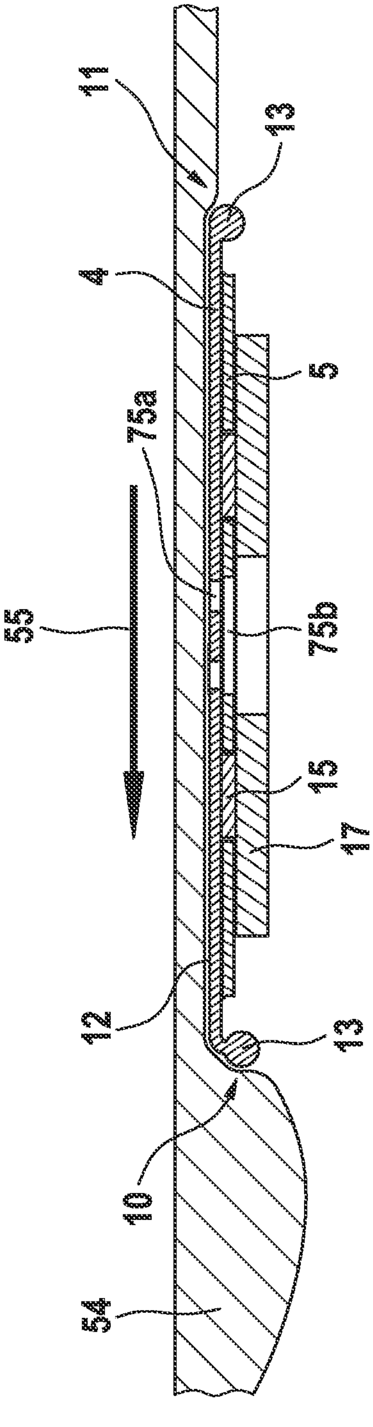
FIGS. 4*a*-4*c*: a cross sectional view of the cutter system in contact with the skin to be shaved, showing the asymmetric rows of cooperating cutting teeth on opposite sides of the cutter head and shaped differently from each other to achieve different skin contact and skin waves when moving the cutter system along the skin to be shaved, wherein partial, enlarged views a and b show the different configuration of the tooth tips of the two rows of cutting teeth.
Figure 4C:
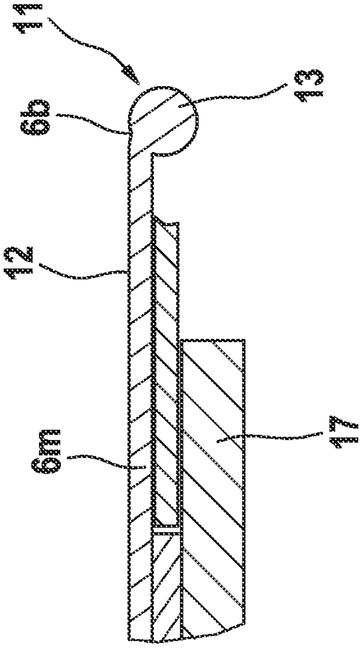
Figure 4B:
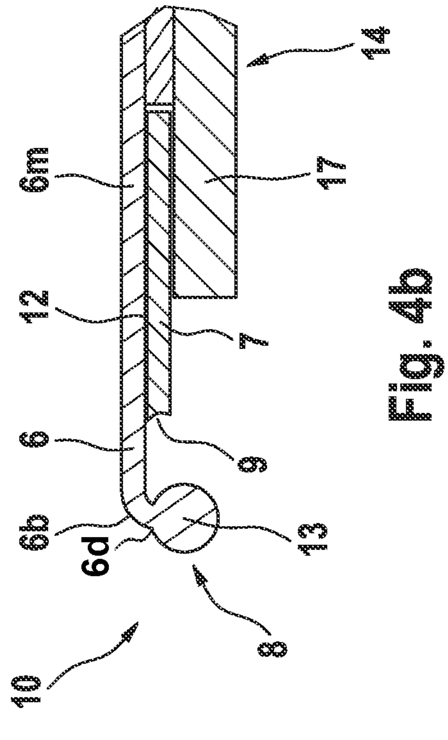
Figure 5B:
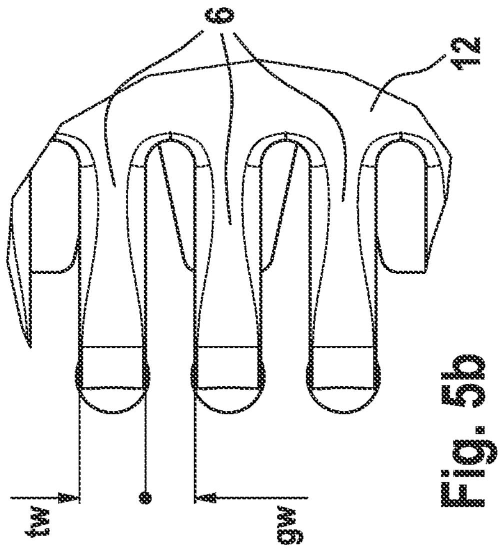
FIGS. 5*a*-5*b*: a side view and a top view of the teeth of the upper cutting element having rounded and thickened tooth tips, wherein view (a) shows a side view of the rounding and thickening, whereas view (b) shows a top view of a pair of teeth with a gap there between, FIG. 6: a cross sectional view of a cutter system similar to FIG. 4*a*, wherein the tooth tips of both rows of cooperating teeth on opposite sides of the cutter head are bent away from the skin contact surface and protrude only to the side opposite to the skin contact surface.
Figure 5A:
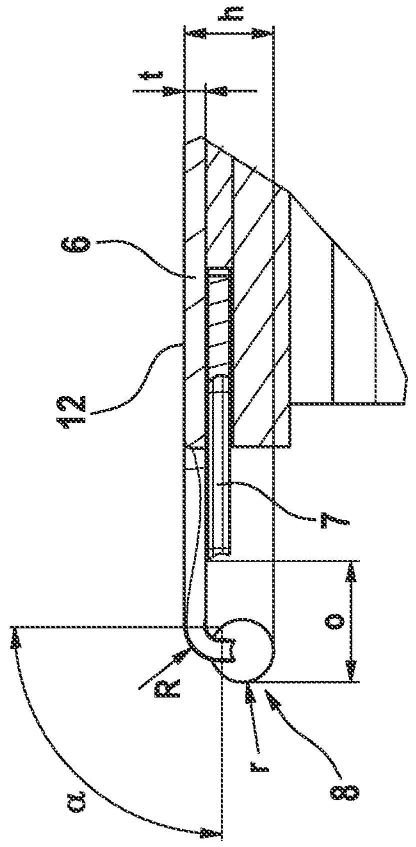
Figure 6:
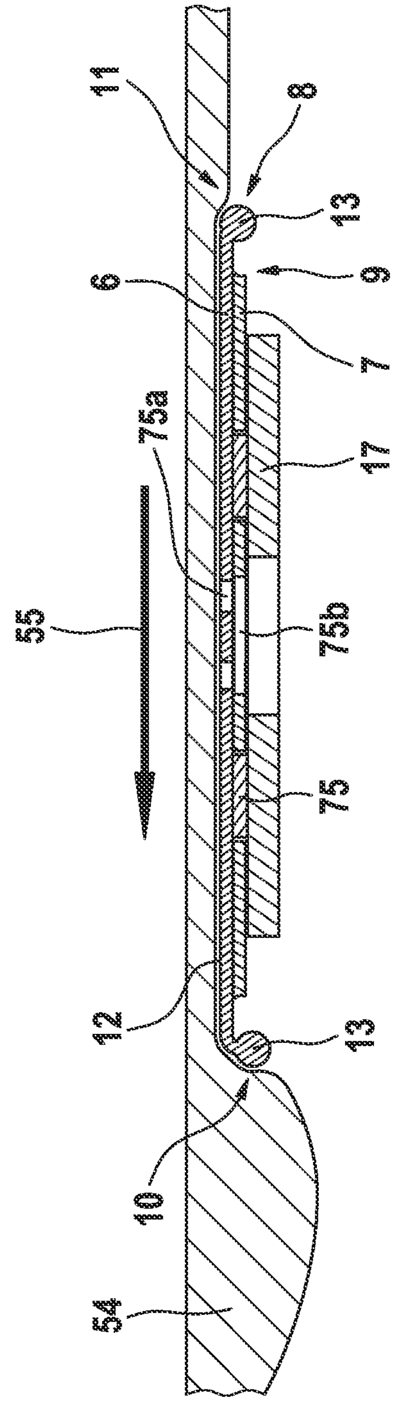

As can be seen from FIGS. 4, 5 and 6, the teeth 6 of the outer cutting element 4 overlap the cutting teeth 7 of the cooperating cutting element 5, wherein the tooth tips 8 of such overlapping teeth 6 may be provided with substantially spherical thickenings 13, cf. also FIG. 9 showing such thickenings 13.

In addition to such thickening 13 forming the outermost tooth tips of the teeth 6, said teeth 6 of the cutting element 4 may be provided with a bent portion **6*b* connecting said thickening 13 to a main tooth portion 6*m* which forms the cutting portion of the teeth as such main tooth portion 6*m* form the blades cooperating with the teeth 7 of the other cutting element 5** in terms of opening and closing the gap between the comb-like, protruding pairs of teeth and passing over each other to achieve shearing of hairs entering into the spaces between the protruding teeth.

Such bent portion **6*b* curves away from the skin contact surface 12 of the cutting teeth 6 of cutting element 4, wherein the bent radius R of such bent portion 6*b* may range from 200 to 400 μm, for example. The bending axis may extend parallel to the reciprocating axis and/or parallel to the longitudinal extension of the row 10, 11 at which the cooperating teeth 6, 7** are arranged.

As can be seen from FIG. **4*b*, the transition portion between the curved portion 6*b* and the thickening 13 may form a slight depression or a concave portion 6*d*, as the thickening 13 may further protrude from the bent portion 6*m*** and may have a different radius of curvature r (which is a sphere radius when the thickening is spherically shaped).

Said bent portion **6*b* may extend over a bent angle α ranging from 10° to 45° or 15° to 30° or 10° to 90° or 15° to 180°, cf. FIG. 5*a***.

The substantially spherical thickenings 13 at the tooth tips 8 may have a diameter ranging from 300 to 550 μm or 350 to 500 μm.

Figure 7D:
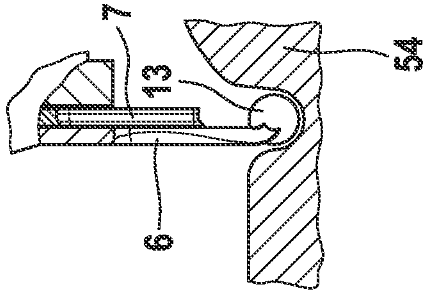
FIGS. 7*a*-7*d*: cross sectional views of the engagement of the tooth tip with the skin to be shaved according to different use options, wherein view (a) shows a smoothly configured tooth tip for close cutting in a fork mode, view (b) shows the smoothly configured tooth tip in a rake mode, view (c) shows an aggressively configured tooth tip for thorough cutting used in a fork mode and view (d) shows the aggressively configured tooth tip of view (c) in a rake mode.
Figure 7C:
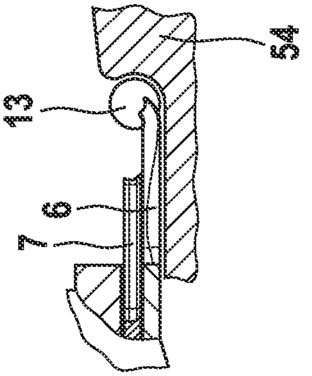
Figure 7B:
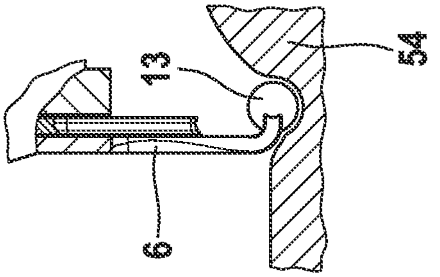
Figure 7A:
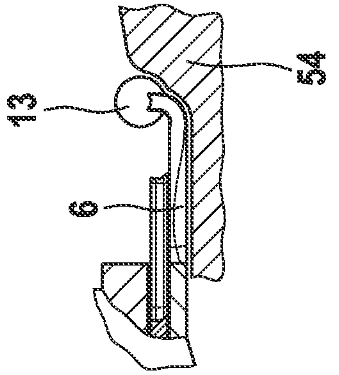

A height h including the entire contour of the thickening 13 and the tooth main portion **6*m* as measured in a direction perpendicular to the skin contact surface 12, may range from 300 to 550 μm to eliminate the risk of penetration when the cutting system is applied in parallel to the skin as it is shown in FIGS. 4 and 6. The enlargement at the end of the tooth 6 for example in form of a sphere or a drop eliminates the risking case of a perpendicular application as it is shown in FIGS. 7*b* and 7*d*. The additional bending of the bent portions 6*b*** with the aforementioned bending radius R up to 400 μm gives an optimal perception of guide with acceptable impact on hair capture.

As shown by FIG. **5*a*, the overhang o defining the length of protrusion of the overhanging teeth 6 beyond the teeth 7 of the other cutting element 5, may range from 400 to 800 μm or 400 to 600 μm. When the cutter system is used like a rake as it is shown in FIGS. 7*b* and 7*d*, such overhanging length o is helpful to prevent the reciprocating teeth 7 of cutting element 5** from touching and irritating the skin.

So as to allow for a close cut, the teeth may have a rather reduced thickness t and/or the thickness t of the teeth 6 and 7 may be adjusted to the gap 22 between pairs of neighboring cutting teeth 6 and 7. Due to the aforementioned described bulging effect of the skin, it may be advantageous to have a teeth thickness t, at a main portion **6*m* of the teeth 6, ranging from 50 to 150 μm or 30 to 180 μm. The teeth 7 of the other cutting element 5** may have the same thickness t.

The gaps 22 between each pair of neighboring cutting teeth 6 and 7 may have a gap width $g_w$ ranging from 150 to 550 μm or 200 to 500 μm.

The width tw of the teeth 6 and/or of the teeth 7 may range from 200 to 600 μm or 250 to 550 μm. As shown by FIG. **5*b*, the width gw of the teeth 6 and 7 may be substantially constant along the longitudinal axis of the teeth. Nevertheless, it would be possible to give the teeth 6 and 7** a slightly V-shaped configuration, wherein the width tw may decrease towards the tips. In such case, the aforementioned width ranges applied to the width tw measured in the middle of the longitudinal extension.

As can be seen from FIGS. **8*e*, 8*f* and 8*g*, the skin contact surface of the finger-like teeth 6 have edges 6*r* which may be rounded and or beveled, wherein such rounding and/or beveling may be more pronounced or may increase towards the root section of the finger-like teeth 6**.

More particularly, the rounding and/or beveling of the skin contact surface edges may be more pronounced and/or larger at a base section or root section of the teeth 6 than the rounding and/or beveling at a middle section and/or a projecting teeth 6 section close to the tooth tips. Said rounding and/or beveling may continuously and/or smoothly increase towards the base section of the teeth 6. Usually, the skin contact pressure decreases towards the base section or root section of the teeth 6 so the increased rounding and/or beveling of the edges of the skin contact surface of the teeth 6 may allow the skin to sufficiently bulge into the gap between the teeth 6despite the decreased skin contact pressure. Thus, an efficient hair cutting and closeness can be achieved over the entire length of the cutting teeth 6.

Said rounding and/or beveling of the edges of the skin contact surface of the teeth 6 also may vary along the length of a row of teeth 6 so that in a middle section of the row the rounding and/or beveling of the edges of the skin contact surface of the teeth 6 may be different from the rounding and/or beveling of the skin contact surface of the teeth 6 in end sections of a row of teeth 6. In particular, the rounding and/or beveling may be larger and/or more pronounced in sections of the row where the skin contact pressure is lower, whereas the rounding and/or beveling may be smaller in sections where the skin contact pressure is higher.

So as to give the user the choice between a more aggressive, closer cutting action on the one hand and a less intensive, more pleasant skin feel on the other hand, the cutter system provides for two separate rows 10, 11 of cooperating teeth 6 which are different from each other in terms of shape and/or size and/or positioning of the thickened and/or rounded tooth tips 8 of the teeth 6. Thus, using a first row 10 of cooperating cutting teeth 6 may provide for a more aggressive, closer cutting action, whereas using a second row 11 of cutting teeth 6 may provide for a less intensive, more pleasant skin feel. The configuration of the tooth tips 8, in particular the configuration of the curvature and thickening thereof may considerably influence the cutting performance and allow the user to choose between closeness, thoroughness, soft skin feel and efficiency.

More particularly, the rows 10, 11 of cooperating teeth 6 may differ from each other in terms of the height of the tooth tips 8 which is, at least in part, defined by the position of the thickening relative to the main portion of the teeth 6 and the size and shape thereof. At one row 10, the thickening may protrude only to the side opposite to the skin contact surface what may be achieved, for example, by bending or curving the teeth portions at which the tip thickenings are attached, away from the skin contact surface and/or attaching the thickening to the main portion of the teeth 6 in an eccentric way, in particular a bit offset away from the skin contact surface. On the other hand, at a second row 11 of cooperating teeth 6, the thickenings at the tooth tips 8 may protrude to both sides of the teeth 6, i.e. to the skin contact surface and to the side opposite thereto.

Said asymmetric rows 10, 11 of cooperating teeth 6 may differ in the heights of the teeth 6 having the overhanging thickened and/or curved tooth tips 8. The height of the teeth 6 may be measured substantially perpendicular to the skin contact surface of the main portion of the teeth 6 and/or perpendicular to a longitudinal axis of the teeth 6, and may include the contour of the thickening at the tips and the upper and/or lower contour of the main portion of the teeth 6. When the thickening protrudes away from the skin contact surface and/or the teeth 6 are curved away from said skin contact surface, the height may span from the lowest point of the thickening to the upper surface of the main portion of the teeth defining the skin contact surface thereof.

Such heights may differ from row to row. More particularly, at one row 10 the height of the cutting teeth 6 having the overhanging tooth tips 8 may range from 300 to 600 μm or 350 to 550 μm, whereas the height at the other row 11 may range from 200 to 500 μm or 250 to 450 μm.

As can be seen from FIG. 1, the rows 10, 11 of teeth 6, 7 having different aggressiveness may be positioned on opposite sides of a cutter head 2 and/or may look into opposite directions, i.e. may be open towards opposite directions so as to allow hair to enter into the gaps between the teeth 6 when moving the cutter head 2 into opposite directions.

More particularly, the cutter system may define a skin contact surface which is inclined at an acute angle relative to the longitudinal axis of the elongated handle 100 of the cutting device so that one side of the skin contact surface slopes down towards a front side of the handle 100, whereas the opposite side of the skin contact surface ascends or slopes up towards the back side of the handle 100. Said front side of the handle 100 may include, for example, an operation button for switching on and off the drive unit and/or may include a surface contour or portion adapted to a thumb gripping the handle 100. Said skin contact surface of the cutter system may form a sort of monopitch roof attached to one end of the handle 100, cf. FIG. 1. However, the skin contact surface does not have to be flat or planar, wherein, when said skin contact surface is convex and/or concave, a plane tangential to the skin contact surface may have the aforementioned inclination relative to the longitudinal axis of the handle 100.

The row 11 of teeth 6 having the more aggressive configuration may be arranged at the lower side of said monopitch roof, i.e. at the side of the skin contact surface sloping down towards the front side of the handle 100, whereas the row of teeth 6 configured less aggressive may be arranged at the opposite side, i.e. at the upper side of the monopitch roof or the side ascending towards the back side of the handle 100. Usually, when the skin contact surface is inclined to slope down towards the front side of the handle 100, the skin contact pressure at the sloped down side is lower than the skin contact pressure at the ascending side. Thus, the more aggressive teeth 6 at the sloped down side having the lower skin contact pressure may achieve efficient hair cutting and catch difficult hair without skin irritations, since the low skin contact pressure is sort of compensated by the increased aggressiveness of the teeth configuration. On the other hand, the less aggressive teeth 6 at the opposite, ascending side of the skin contact surface may compensate for the higher skin contact pressure there and avoid skin irritations.

Figure 12B:
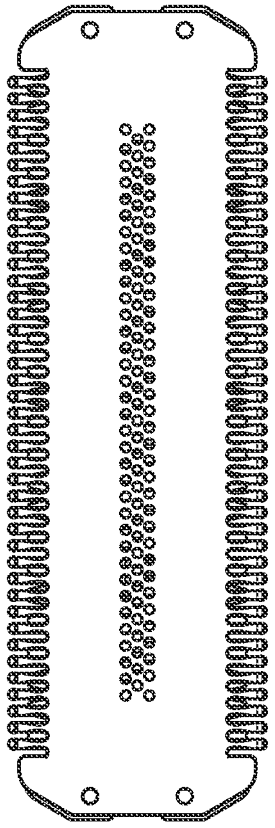
FIGS. 12*a*-12*b*: a top view onto the skin contact surface of a cutter system having differently configured teeth in each row of cooperating teeth, wherein partial view (a) shows an example having more aggressively configured teeth in a middle section of the rows of cooperating teeth and less aggressively configured teeth in opposite end sections of the rows to compensate for skin contact pressure increasing towards the end sections, and partial view (b) shows another example having more aggressively configured teeth in the end sections of the rows and less aggressively configured teeth in the middle section of the rows to compensate for skin pressure increasing towards the middle section.
Figure 12A:
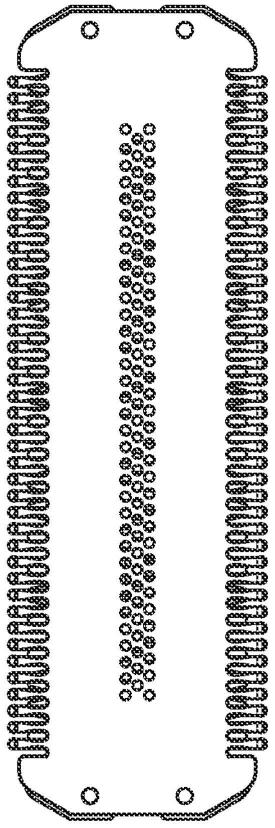
Figure 13A:
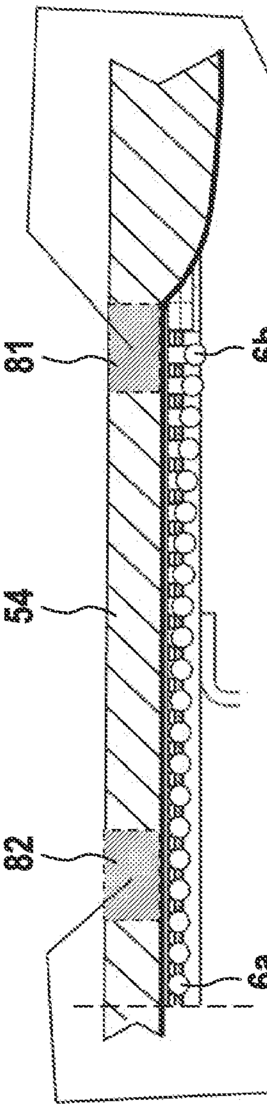
FIGS. 13*a*-13*c*: the relationship between tooth configuration and skin contact pressure varying along a row of teeth, wherein partial view (a) shows a front view onto the tooth tips of a row of cooperating teeth in engagement with the skin of a user, partial view (b) shows the skin contact pressure and the pressure on the teeth in reaction thereto, for different portions of the skin contacting different sections of a row of teeth, and partial view (c) shows the skin contact pressure increasing from the center of the row of teeth towards the lateral end thereof.
Figure 13B:
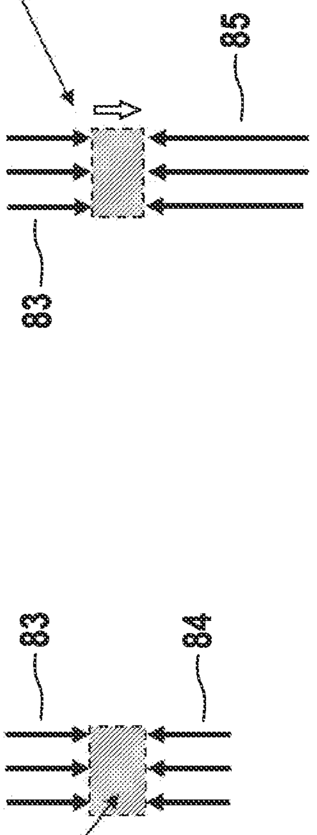
Figure 13C:
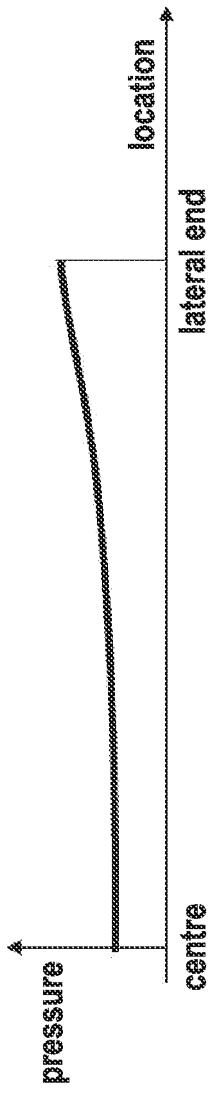

As can be seen from FIGS. 12, 13 and 14, the aggressiveness of the teeth 6 may vary also within the same row of cooperating cutting teeth 6. More particularly, the cutting teeth 6 in a middle section of a row may be different from cutting teeth 6 in end sections of said row in terms of shape and/or size and/or position of the tooth tips so as to provide for a different level of aggressiveness. More particularly, in sections of relatively high skin contact pressure, the teeth 6 may be configured to provide for reduced aggressiveness, whereas the teeth 6 arranged in sections having relatively low skin contact pressure may be configured to provide for a higher level of aggressiveness.

The skin contact pressure may vary due to the contour of the skin contact surface of the cutter system. For example, when the skin contact surface of the cutter system is substantially flat and/or substantially planar and/or slightly concave, the skin contact pressure may increase towards the lateral end portions of the skin contact surface, as can be seen from FIG. 14*a*. Said lateral end portions mean the end portions in the direction of the reciprocating movement of the cutting teeth 6 relative to each other. When considering the usual movement of the cutter head 2 or cutter system along the skin, said lateral end portions are the right and left end portions of the comb-like cutter. So as to achieve uniform cutting despite such varying skin contact pressure, the teeth 6 positioned in the middle section having the lower skin contact pressure may be configured to have a higher aggressiveness what might be achieved by means of a smaller diameter of the rounded tooth tips and/or less curvature away from the skin contact surface. On the other hand, the teeth 6 positioned in the end sections having higher skin contact pressure may be configured to provide for reduced aggressiveness what might be achieved by an increased diameter of the rounded tooth tips and/or more curvature away from the skin contact surface.

Figure 14B:
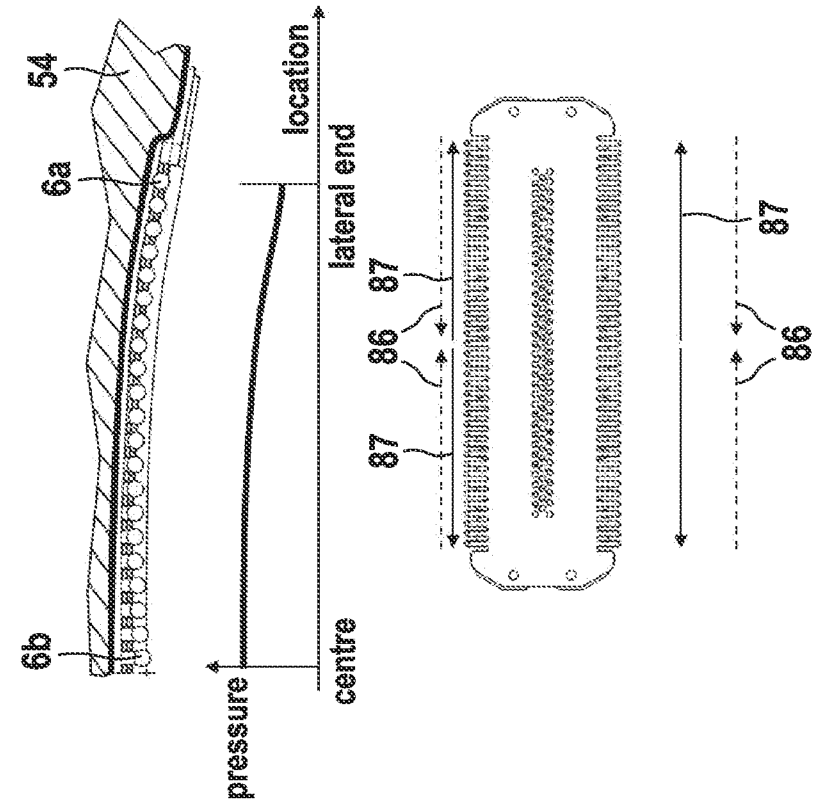
FIGS. 14*a*-14*b*: the skin contact pressure and teeth configuration varying along the teeth rows similar to FIG. 13*a*, wherein partial view (a) shows a cutter system with a substantially flat or planer skin contact surface with skin contact pressure increasing from the center towards the lateral end portions of the teeth rows, and partial view (b) shows a cutter system with a convex skin contact surface with skin contact pressure decreasing towards the lateral end portions of the teeth rows.
Figure 14A:
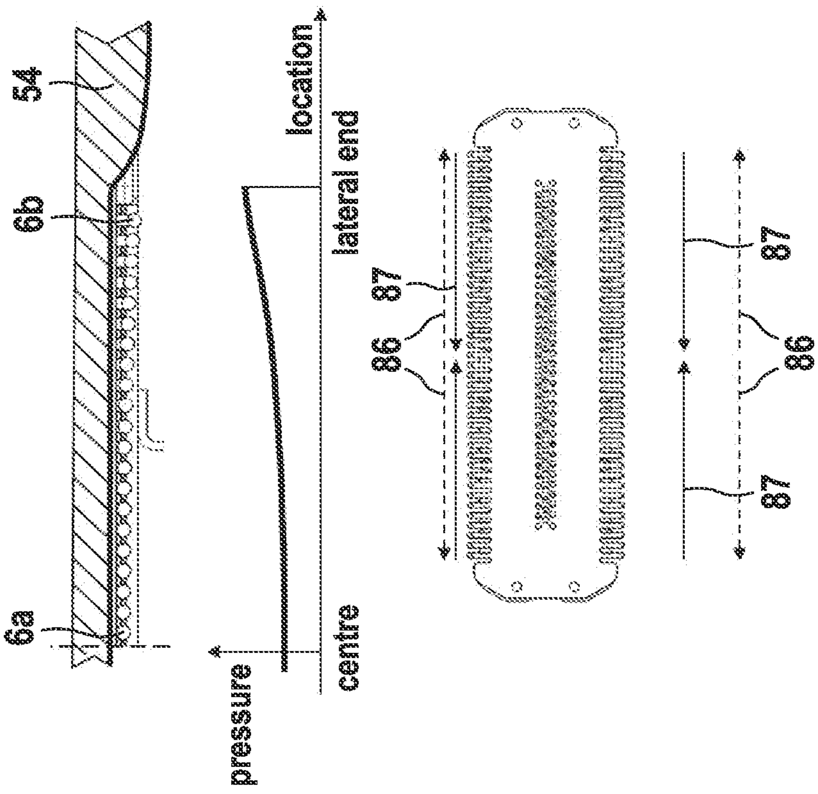

As can be seen from FIG. 14*b*, the skin contact surface of the cutter system may have a convex contour when viewed in a cross-sectional plane parallel to the direction of reciprocating movement of the cooperating teeth 6 relative to each other and perpendicular to the skin contact surface. In other words, the skin contact surface of the cutter system may slope down or may be curved away from the skin towards the lateral end portions towards which the teeth 6 reciprocate. Due to such convex contour of the skin contact surface, the skin contact pressure may decrease from the center section of the cutter system towards the end portions thereof. So as to compensate for such varying skin contact pressure, the teeth 6 in the lateral end sections may be configured to have an increased aggressiveness, whereas the teeth 6 in a middle section may be configured less aggressive, as can be seen from FIG. 14*b*.

It may be sufficient to have three or four or five groups of teeth 6 in a row having the aforementioned different configuration and different aggressiveness. On the other hand, the configuration of the teeth 6 of a row may change step by step or continuously from the center of the row of teeth 6 to the end portions thereof, wherein said change of the configuration may provide for a distribution of tooth configurations substantially symmetrical with regard to the center of the row of teeth 6. More particularly, the tooth aggressiveness may change step by step or continuously from the center of a row towards each of the end sections thereof, as can be seen from FIG. 14*b*.

Figure 15B:
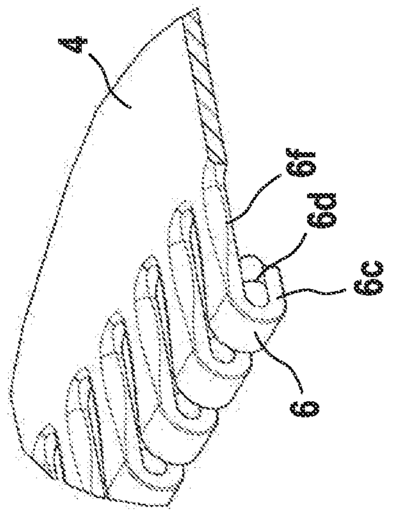
FIGS. 15*a*-15*c*: perspective views of teeth having composite tooth tips with a filler surrounded by an outer layer.
Figure 15A:
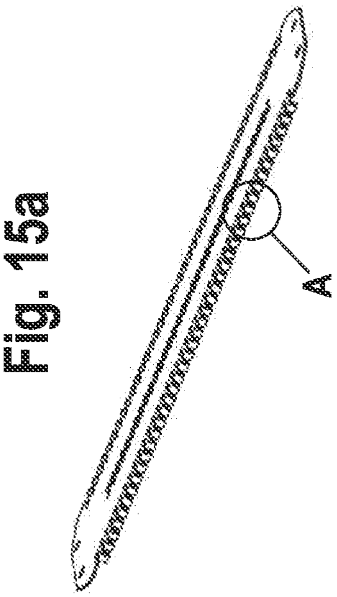
Figure 15C:
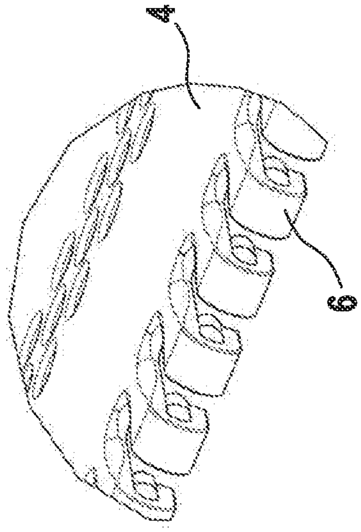
Figure 16B:
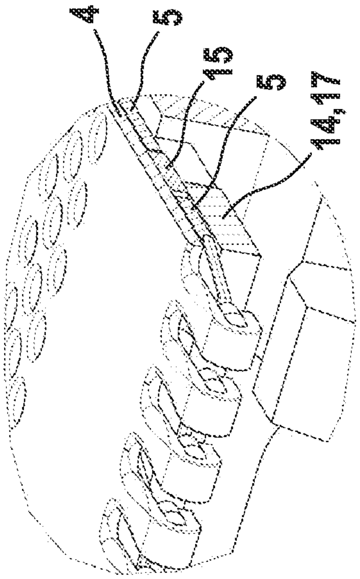
FIGS. 16*a*-16*c*: perspective views of the teeth having the composite tooth tips cooperating with teeth reciprocating relative thereto.
Figure 16A:
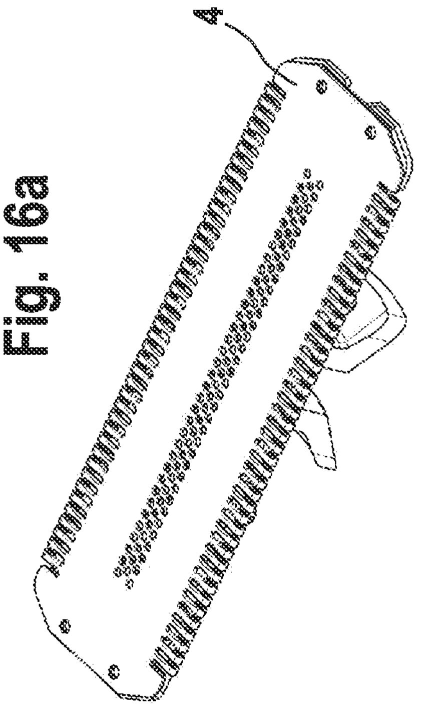
Figure 16C:
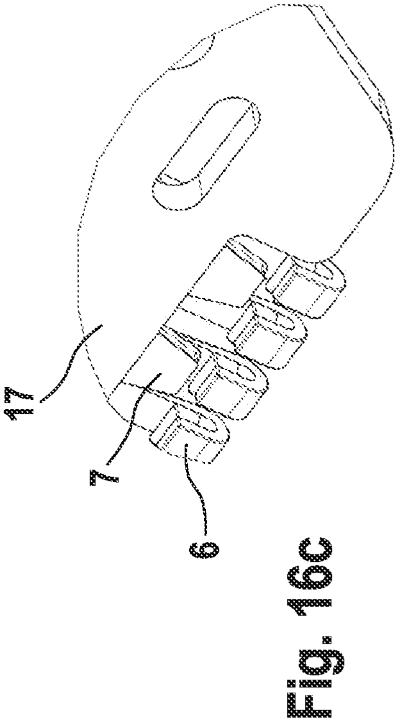

As can be seen from FIGS. 15 and 16, the teeth 6 or at least some of the teeth 6 may have composite tooth tips including different layers of material and/or different materials. More particularly, a filler or inner layer may be surrounded by an outer layer.

As can be seen from FIG. 15, the teeth 6 include composite thickenings 13, including an outer shell 13*o* surrounding an inner core 13*i*, wherein said outer shell 13*o* may surround the inner core 13*i* at three sides thereof. The inner core 13*i* may be uncovered or visible from at least two opposite sides which face neighboring teeth 6. The outer shell 13*o* may have three open sides two of which may face the neighboring teeth and a third one may face the tooth tips of the teeth 7 of the other cutting element 5, cf. FIG. 16.

As can be seen from FIG. 15, the finger-like teeth 6 may be formed from a thin plate-like metal sheet and/or may include substantially plate-shaped tooth bodies, wherein the outer or projecting end portions of the finger-like teeth are bent by more than 90° or more than 100° or more than 120° and/or may form substantially U-shaped end portions, which bent or curved end portions of the finger-like teeth form an outer layer of the tooth tip. Such outer layer surrounds an inner layer or filler layer which may fill-out substantially the entire space between the opposite legs of the U-shaped end portions, cf. FIG. 15. Such filler layer may be a polymeric material or foam material or any other suitable matrix material to fill the space surrounded by the bent end portion.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A cutter system for an electric shaver or trimmer, comprising a pair of comb-like cutting elements each with at least one row of cutting teeth and movable relative to each other, wherein one of said cutting elements has thickened or rounded tooth tips overhanging tooth tips of the other cutting element, wherein said overhanging tooth tips are provided with a two-step rounding including a spherical or drop-shaped or pearl-shaped thickening and a bent or curved portion connecting said thickening to a main tooth portion and bent or curved away from a skin contact surface of said main tooth portion, wherein a concave depression is formed in a transitional section between said thickening and said bent or curved portion on a skin contact side of said cutting teeth.

2. The cutter system according to claim 1, wherein
- said bent or curved tooth portion has a curve radius smaller than about 400 μm or ranging from about 200-about 400 μm, or
- said thickening has a diameter ranging from about 300-about 550 μm, or
- an overhanging length defining a length of a protrusion of said overhanging tooth tips beyond said tooth tips of said other cutting element ranging from about 400-about 800 μm.

3. The cutter system according to claim 1, wherein said bent or curved tooth portion extends over a bent angle α ranging from about 10° to about 100°.

4. The cutter system according to claim 1, wherein at least some of said overhanging tooth tips have
- a height measured in a direction perpendicular to said skin contact surface, ranging from about 350-about 550 μm, and
- said spherical or drop-shaped or pearl-shaped thickening with a diameter ranging from about 350-about 550 μm.

5. The cutter system according to claim 1, wherein said skin contact surfaces of said cutting teeth have rounded or beveled edges, wherein said rounding or beveling of said edges of said skin contact surfaces of said cutting teeth varies along a longitudinal tooth axis.

6. The cutter system according to claim 5, wherein said rounding or beveling of said edges of said skin contact surface of said cutting teeth is increasing step by step or continuously towards a root section of said cutting teeth.

7. The cutter system according to claim 1, wherein said cutting teeth, at said main tooth portion providing for cutting action, have a tooth width ranging from about 250-about 550 μm and a thickness ranging from about 50-about 150 μm, said tooth width or said thickness being measured at a half-length of said cutting teeth.

8. The cutter system according to claim 1, wherein said cutting teeth define a gap between neighboring cutting teeth, having a gap width ranging from about 200-about 500 μm, said gap width measured at a half-length of said cutting teeth.

9. The cutter system according to claim 1, wherein at least some of said overhanging tooth tips have
- a height measured in a direction perpendicular to said skin contact surface ranging from about 250-about 450 μm, and
- said spherical or drop-shaped or pearl-shaped thickenings with a diameter ranging from about 200-about 450 μm.

10. An electric shaver or trimmer, comprising said cutter system which is configured in accordance with claim 1.

11. A method of manufacturing said cutter system configured according to claim 1, comprising:
- forming a toothed cutting edge at each cutting element including a plurality of said cutting teeth, and
- forming said thickening at said tooth tips of at least some of said cutting teeth, wherein said cutting teeth, at their said tooth tips, are bent about a bending axis parallel to said toothed cutting edge before said thickening is formed at said tooth tips.

* * * * *